US007812921B2

(12) United States Patent
Lee et al.

(10) Patent No.: US 7,812,921 B2
(45) Date of Patent: Oct. 12, 2010

(54) THIN FILM TRANSISTOR SUBSTRATE WITH COLOR FILTER AND METHOD FOR FABRICATING THE SAME

(75) Inventors: Deok Won Lee, Seongnam-si (KR); Kwang Sik Oh, Gyeongsangbuk-do (KR); Myung Woo Nam, Gyeongsangbuk-do (KR); Ki Du Cho, Gumi-si (KR); Se Jong Shin, Daegu (KR); Bong Chul Kim, Daegu (KR); Kwon Seob Choi, Cheongju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/457,642

(22) Filed: Jun. 17, 2009

(65) Prior Publication Data

US 2009/0263921 A1   Oct. 22, 2009

Related U.S. Application Data

(62) Division of application No. 11/135,646, filed on May 24, 2005, now Pat. No. 7,561,229.

(30) Foreign Application Priority Data

May 24, 2004   (KR) .................. 10-2004-036977

(51) Int. Cl.
*G02F 1/13* (2006.01)
(52) U.S. Cl. .................. 349/187; 349/43; 349/106; 349/138
(58) Field of Classification Search .................. 349/106, 349/43, 138, 187
See application file for complete search history.

(56) References Cited

U.S. PATENT DOCUMENTS

| 6,577,374 | B1 | 6/2003 | Nakata et al. |
| 2004/0125277 | A1 | 7/2004 | Kim et al. |

*Primary Examiner*—Thoi V Duong
(74) *Attorney, Agent, or Firm*—McKenna Long & Aldridge

(57) ABSTRACT

A color filter-on-thin film transistor substrate includes gate data lines crossing each other and defining pixel areas, thin film transistors is located at crossings of gate and data lines, pixel electrodes connected to the thin film transistors and formed within the pixel areas, and stripe-shaped color filters overlapping a plurality of pixel areas and oriented parallel to one of the gate and data lines.

4 Claims, 25 Drawing Sheets

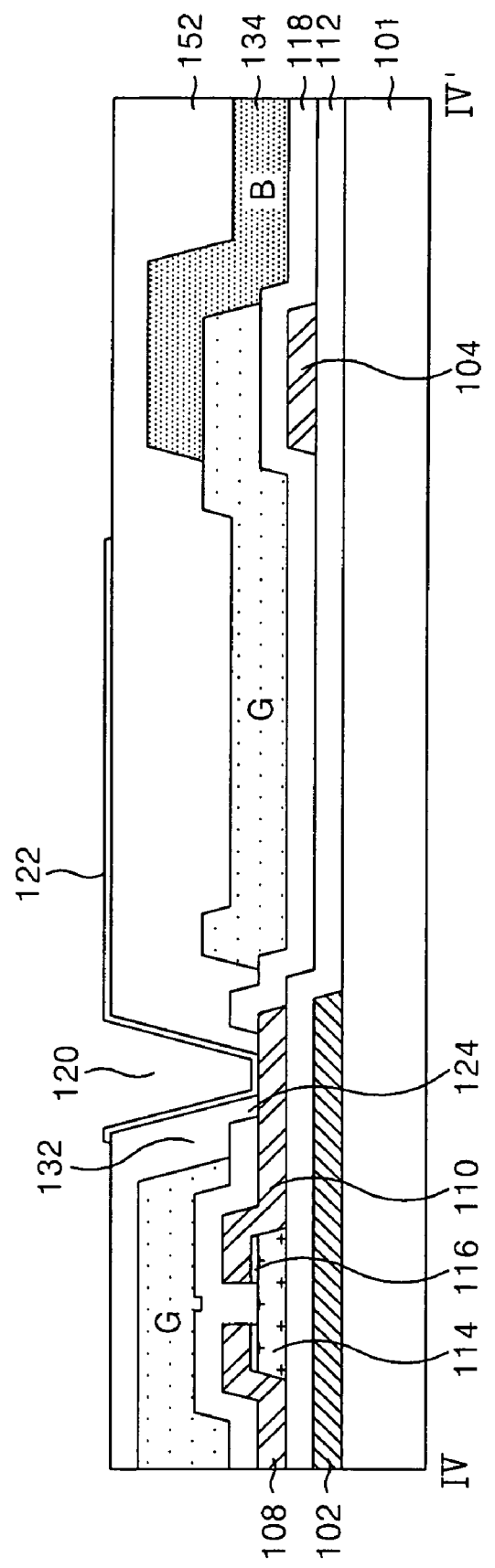

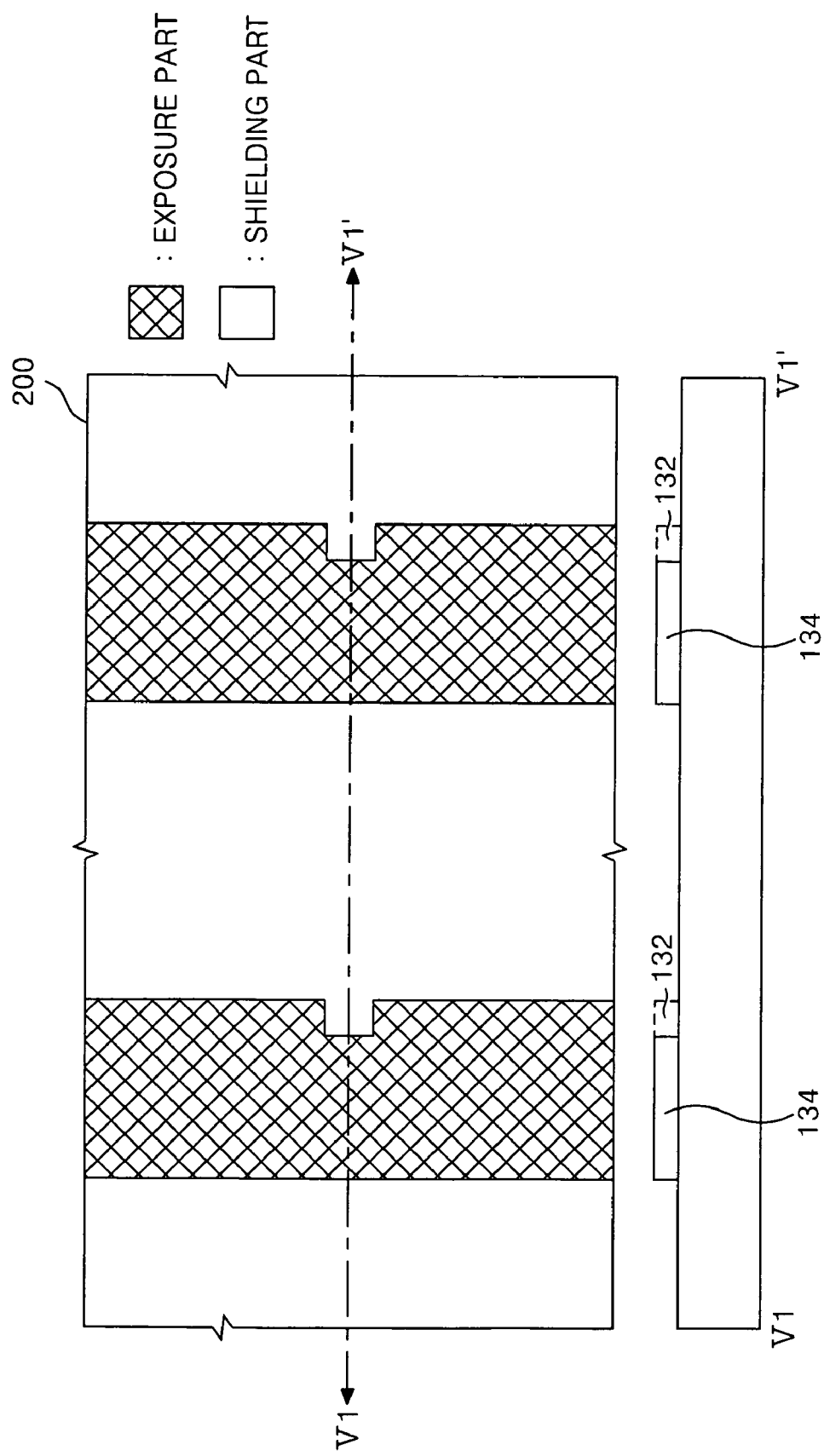

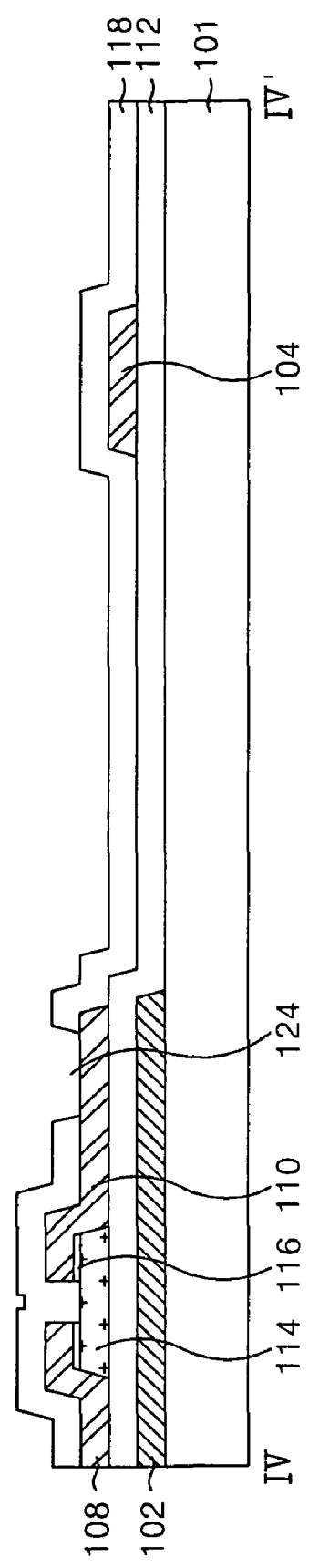

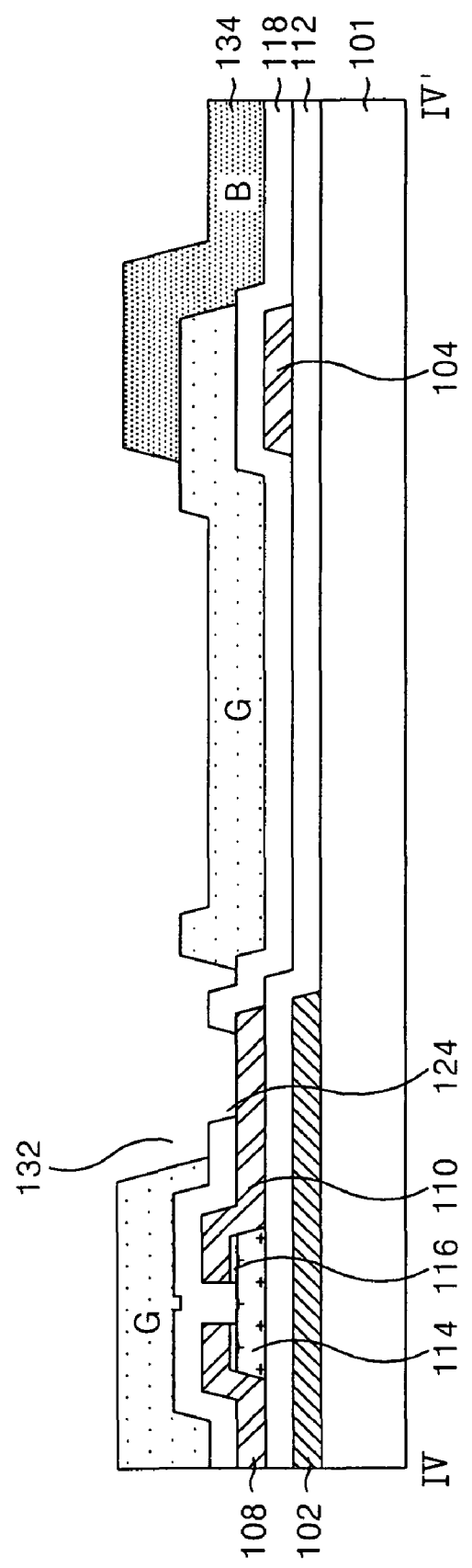

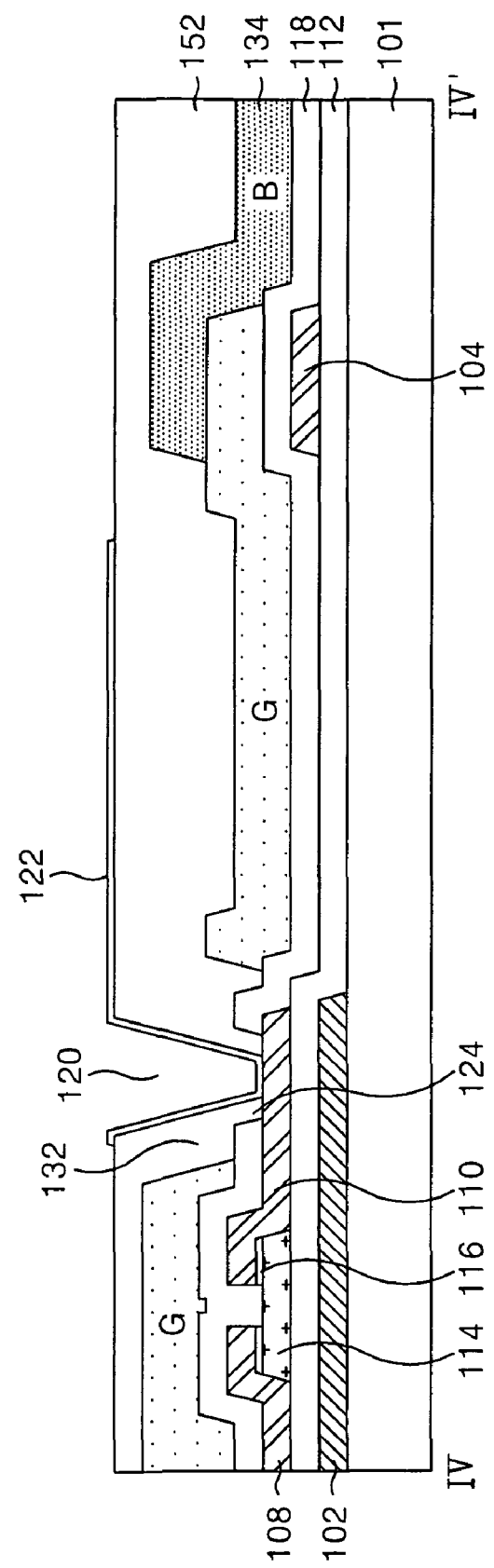

US 7,812,921 B2

THIN FILM TRANSISTOR SUBSTRATE WITH COLOR FILTER AND METHOD FOR FABRICATING THE SAME

This is a Divisional Application of U.S. patent application Ser. No. 11/135,646, filed on May 24, 2005, now U.S. Pat. No. 7,561,229; which claims the benefit of Korean Patent Application No. 2004-36977, filed on May 24, 2004, all of which are hereby incorporated by reference for all purposes as if fully set forth herein.

BACKGROUND OF THE INVENTION

1. Field of the Invention

The principles of the present invention relate to liquid crystal display devices. More particularly, the principles of the present invention relate to a color filter-on-thin film transistor (COT) substrate incorporating a color filter and a method of fabricating the same, wherein such a COT substrate prevents TFTs from malfunctioning due to exposure to external light as well as reducing reflections of external light by signal lines without using a black matrix.

2. Discussion of the Related Art

Liquid crystal display (LCD) devices control light transmissivity characteristics of liquid crystal material with electric fields to display pictures. Thus, LCD devices typically include an LCD panel having liquid crystal cells arranged in a matrix pattern and a drive circuit for driving the LCD panel.

LCD panels generally include a TFT substrate and a color filter substrate facing each other, a liquid crystal layer injected between the two substrates, and a spacer to maintain the distance between the two substrates (i.e., a cell gap). The TFT substrate generally includes a pixel electrode formed within each liquid crystal cell, wherein the liquid crystal cells are defined by crossings of gate and data lines; a TFT connected between the gate line, the data line, and the pixel electrode; a plurality of insulating films; and an alignment film formed over the resulting structure. The color filter substrate generally includes a color filter layer having color filters individually aligned with the liquid crystal cells of the TFT substrate; a black matrix film to visually isolate adjacent color filters and to reflect external light; a common electrode to supply a reference voltage to the liquid crystal layer; and an alignment film formed over the resulting structure.

After providing the TFT and color filter substrates, formation of the LCD panel can be completed in one of two ways: the TFT substrate and the color filter substrate is bonded together, liquid crystal material is injected into the cell gap, and the cell gap sealed; or liquid crystal material is dispensed on either the TFT or color filter substrate and the two substrates are then bonded together. In either process, the two substrates are aligned before they are bonded together so that each color filter of the color filter substrate is aligned with an individual pixel electrode of the thin film transistor substrate. Accordingly, if the two substrates are not aligned correctly, the LCD panel exhibits a light-leakage defect. To minimize the effects of the light-leakage defect, the width of the black matrix film can be increased. This solution, however, is undesirable because use of such a black matrix film results in an LCD panel having a deteriorated aperture ratio. Accordingly, a color filter-on-TFT (COT) substrate has been developed, wherein the aforementioned color filter layer is incorporated within the TFT substrate.

FIG. 1 illustrates a plan view of a related art COT substrate.
FIG. 2 illustrates a sectional view of the COT substrate shown in FIG. 1, taken along the line II-II'.

Referring to FIGS. 1 and 2, a related art COT substrate includes a substrate 1, a TFT array formed on the substrate 1, a color filter layer on the TFT array, a black matrix film 32 formed over the TFT array and color filter layer, an overcoat layer 52 on the color filter layer and the black matrix film 32, and pixel electrodes 22 on the overcoat layer 52. The TFT array generally includes gate lines 2, data lines 4, TFTs 30 and a protective film 18 while the color filter layer typically includes red (R), green (G), and blue (B) color filters 34. Moreover, each of the pixel electrodes 22 overlap with individual ones of the R, G, and B color filters 34 and are separated therefrom by the overcoat layer 52.

The gate and data lines 2 and 4, respectively, cross each other over the substrate 1 and are separated from each other by a gate insulating film 12. Accordingly, pixel areas are defined by the crossings of the gate and data lines 2 and 4. Each TFT 30 includes a gate electrode 6 connected to a corresponding gate line 2, a source electrode 8 connected to a corresponding data line 4, a drain electrode 10 opposing the source electrode 8, an active layer 14 overlapping the gate electrode 6 and separated therefrom by the gate insulating film 12 to form a channel between the source and drain electrodes 8 and 10, and an ohmic contact layer 16 to reduce a contact resistance between the active layer 14 and the source and drain electrodes 8 and 10. The protective film 18 is formed over the gate insulating film 12 and covers the TFTs 30 and the data lines 4.

The R, G, and B color filters 34 are formed on the protective film 18 and are confined to the pixel areas defined by the crossings of the gate and data lines 2 and 4 (i.e., at most, the R, G, and B color filters 34 partially overlap adjacent ones of gate and data lines 2 and 4). Therefore, the COT substrate shown in FIGS. 1 and 2 includes discretely arranged R, G, and B color filters 34 that are completely isolated from each other.

The black matrix film 32 is formed on the protective film 18, and overlaps the gate and data lines 2 and 4, the TFTs 30, and peripheral portions of R, G, and B color filters 34. Formed as described above, the black matrix film 32 prevents the generation of light-leakage between adjacent the color filters 34, reflects external light, and prevents photo-induced leakage current, generated when the channel of the TFT 30 is exposed to external light.

The overcoat layer 52 is provided as an organic insulating material and is formed on the R, G, and B color filters 34 and on the black matrix film 32 to compensate for the step difference that exists between the R, G, and B color filters 34 and the black matrix film 32, thereby forming an even surface and preventing impurities from the color filters 34 and the black matrix 32 to contaminate a subsequently provided liquid crystal layer.

Each pixel electrode 22 is formed on the overcoat layer 52 and is aligned with a pixel area so as to overlap with an individual color filter 34. Further, each pixel electrode 22 is connected to a corresponding drain electrode 10 via a contact hole 20 formed through the overcoat layer 52, a corresponding color filter 34, and the protective film 18.

Constructed as described above, each pixel electrode 22 must contact a corresponding drain electrode 10 via a contact hole 20 that, undesirably, is formed through the entire thickness of a corresponding color filter 34. When a contact hole is formed through the entire thickness of a color filter, a potentially unattractive light transmission pattern can result. Moreover, it is desirable but difficult for the contact hole 20 to be sufficiently narrow through the entire thickness of the color filter 34. As a result, it is desirable but difficult for the contact hole 20 to have a high aspect-ratio (i.e., a large contact hole depth compared to the contact hole width). To overcome this difficulty, it has been proposed to form the contact hole 20 in a region that overlaps the gate line 2 where no color filter 34 is formed but where the protective film 18 and the overcoat layer 52 are formed. Accordingly, the contact hole 20 can be formed in two mask processes wherein the protective film 18 and the overcoat layer 52 are separately patterned. However, because the black matrix film 32 overlaps the gate line 2 and peripheral portions of the color filters 34, the contact hole 20 must also be formed through the black matrix film 18. As a result, an additional mask process must be used to form the contact hole 20, wherein the black matrix film 32 is additionally patterned. Thus the number of processes required to form the contact hole 20 in a region overlapping the gate line 2, where no color filter 34 is formed, undesirably increases and results in increased manufacturing costs and decreased productivity.

SUMMARY OF THE INVENTION

Accordingly, the present invention is directed to a COT substrate and a method for fabricating the same that substantially obviates one or more of the problems due to limitations and disadvantages of the related art.

An advantage of the present invention provides a COT substrate that reduces reflections of external light by signal lines without using a black matrix.

Another advantage of the present invention provides a COT substrate that prevents TFTs from malfunctioning due to exposure to external light Additional advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a TFT substrate may, for example, include gate lines; data lines crossing the gate lines to define pixel areas; a gate insulating film between the gate and data lines; TFT arranged at crossings of the gate and data lines; pixel electrodes connected to corresponding TFTs and arranged within corresponding pixel areas; and stripe-shaped color filters overlapping the pixel electrodes and arranged parallel to any one of the gate and data lines.

According to principles of the present invention, a method of fabricating a TFT substrate may, for example, include forming gate lines, data lines crossing the gate lines to define pixel areas; arranging a gate insulating film between the gate and data lines; providing TFTs at crossings of the gate and data lines; forming a protective film over the TFTs; forming stripe-shaped color filters on the protective film and parallel to any of gate and data lines; and forming pixel electrodes connected to corresponding TFTs over corresponding color filters.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 illustrates a sectional view of the COT substrate shown in FIG. 3, taken along the line IV-IV';

FIG. 5A illustrates a fabricating process of locating a concave part at an edge region of a color filter and FIG. 5B illustrates a fabricating process of locating a concave part at a central region of a color filter.

FIGS. 7A and 7B illustrate plan and sectional views, respectively, of the formation of a protective film according to principles of the present invention;

FIGS. 8A and 8B illustrate plan and sectional views, respectively, of the formation of a color filter layer according to principles of the present invention;

FIGS. 10A and 10B illustrate plan and sectional views, respectively, of the formation of a transparent conductive pattern according to principles of the present invention;

DETAILED DESCRIPTION OF THE ILLUSTRATED EMBODIMENTS

Reference will now be made in detail to embodiments of the present invention, example of which is illustrated in the accompanying drawings.

Figure 3:
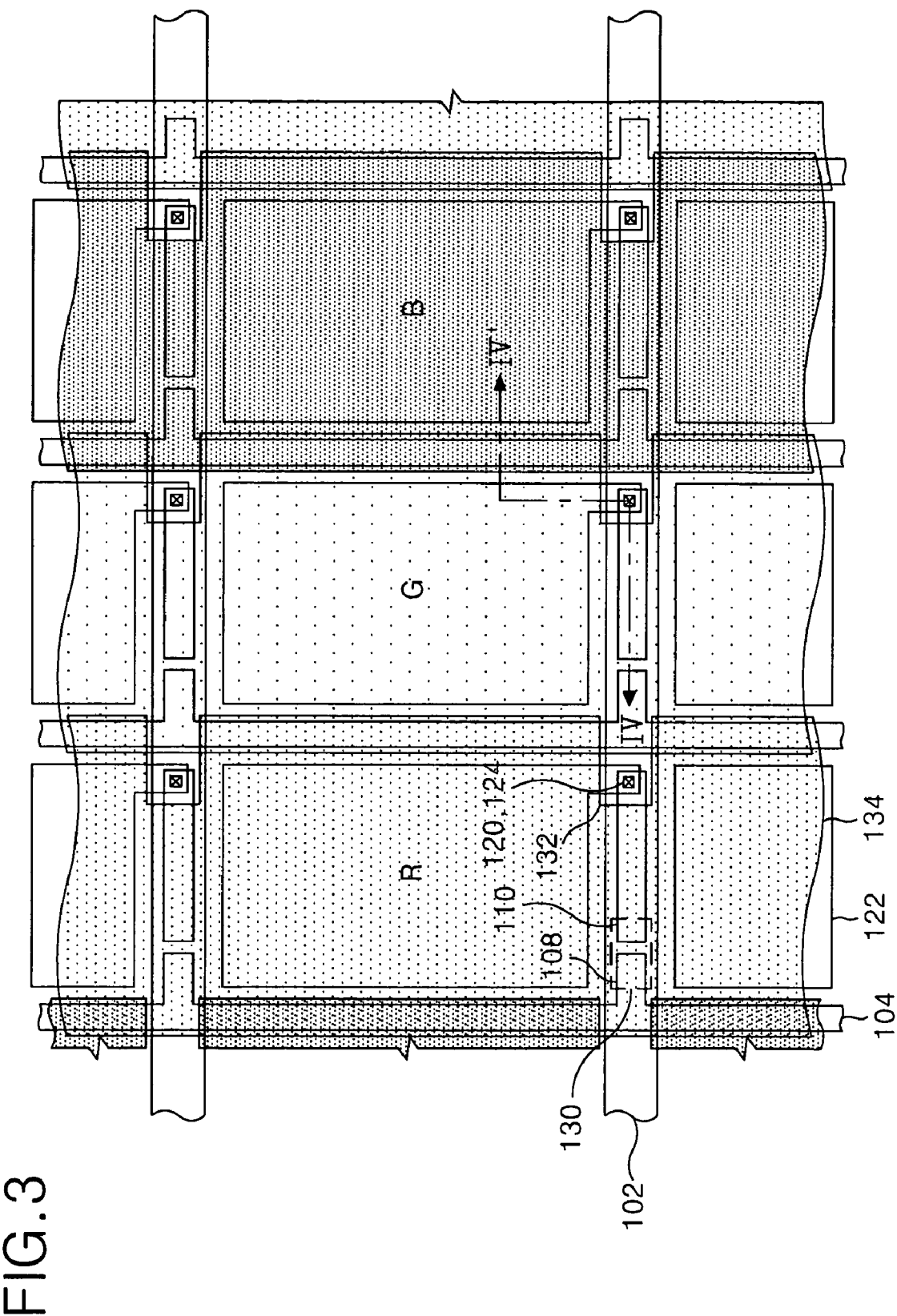
FIG. 3 illustrates a plan view of a COT substrate according to a first embodiment of the present invention.

FIG. 3 illustrates a plan view of a COT according to a first embodiment of the present invention. FIG. 4 illustrates a sectional view of the COT substrate shown in FIG. 3, taken along the line IV-IV'.

Referring to FIGS. 3 and 4, the COT substrate according the first embodiment of the present invention may, for example, include a substrate 101, a TFT array formed on the substrate 101, a color filter layer on the TFT array, an overcoat layer 152 on the color filter layer, and pixel electrodes 122 on the overcoat layer 152. The TFT array generally includes gate lines 102, data lines 104, TFTs 130 and a protective film 118 while the color filter layer typically includes red (R), green (G), and blue (B) patterned color filters 134. Moreover, each of the pixel electrodes 122 overlap with corresponding ones of the patterned R, G, and B color filters 134 and are separated therefrom by the overcoat layer 152.

The gate and data lines 102 and 104, respectively, cross each other over the substrate 101 and may be separated from each other by a gate insulating film 112. Accordingly, pixel areas are defined by the crossings of the gate and data lines 102 and 104. Each TFT 130 may, for example, include a gate electrode 106 connected to and extending from a corresponding gate line 102, a source electrode 108 connected to and extending from a corresponding data line 104, a drain electrode 110 opposing the source electrode 108, an active layer 114 overlapping the gate electrode 106 and separated therefrom by the gate insulating film 112 to form a channel between the source and drain electrodes 108 and 110, and an ohmic contact layer 116 to reduce a contact resistance between the active layer 114 and the source and drain electrodes 108 and 110. The protective film 118 may be formed over the gate insulating film 112 and may cover the TFTs 130 and the data lines 104.

According to principles of the present invention, the patterned R, G, and B color filters 134 may, for example, be arranged on the protective film 118 and may be aligned with predetermined groups of pixel areas. In one aspect of the present invention, the patterned R, G, and B color filters 134 may be essentially stripe-shaped, wherein predetermined groups of pixel areas are aligned with a predetermined patterned color filter 134 that transmits light having a predetermined wavelength range. In one aspect of the first embodiment of the present invention, each patterned color filter 134 may overlap the gate lines 102 and may be formed to a predetermined thickness such that a predetermined amount (e.g., at least about 90%) of external light that is incident to the COT substrate, as well as light that is reflected by the gate line 102, is absorbed by the patterned color filter 134. Accordingly, a black matrix film that overlaps the gate lines 102 and corresponding peripheral portions of the color filters 134 is not required. In another aspect of the first embodiment, two patterned color filters 134, capable of transmitting light having different wavelength ranges, may overlap each other on adjacent data lines 104. Thus, when two such patterned color filters 134 overlap each other over any data line 104, as shown in FIG. 4, they effectively function as a black matrix film to absorb substantially all external light that is incident to the COT substrate as well as light that is reflected by the data line 104. Accordingly, a black matrix film that overlaps the data lines 104 and corresponding peripheral portions of the color filters 134 is not required. By eliminating the need for a black matrix film, the COT substrate according to the first embodiment of the present invention may be fabricated in a reduced number of mask processes, thereby decreasing manufacturing costs and increasing productivity.

According to principles of the present invention, first pixel contact holes 124 having a first width may be formed through the protective film 118 to expose a portion of corresponding drain electrodes 110. In one aspect of the present invention, each patterned color filter 134 may, for example, include a first concave part 132 that is aligned with a corresponding first pixel contact hole 124. In another aspect of the present invention, the first width of the first pixel contact hole 124 may be less than a width of the first concave part 132 such that the first pixel contact hole 124 and a portion of the protective film 118 are exposed by the first concave part 132. The formation of the first concave part 132 will now be discussed with reference to FIGS. 5A and 5B.

Figure 5B:
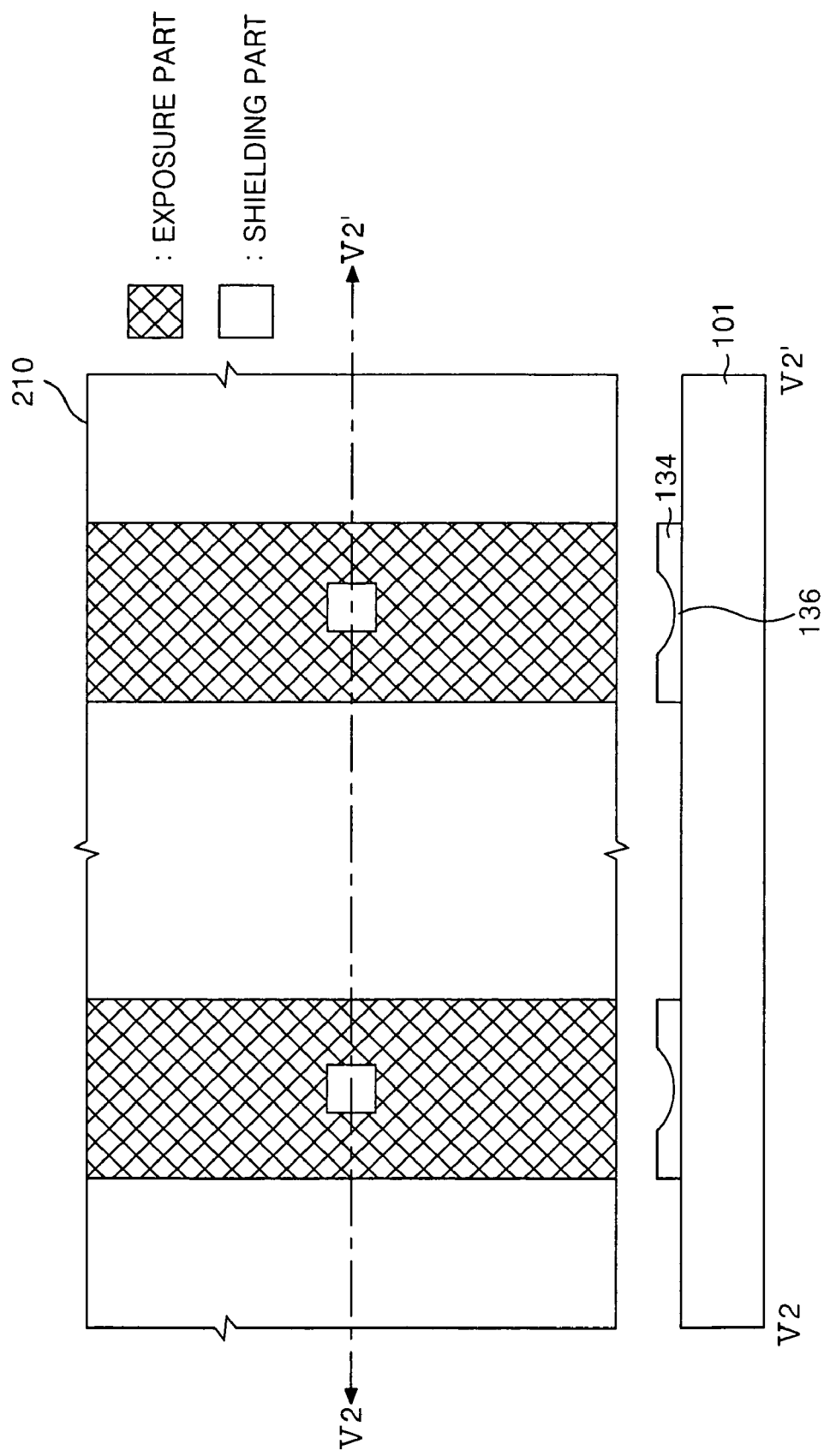

Referring to FIGS. 5A and 5B, a photo-mask may be used to aid in the formation of the patterned color filters 134. In a first aspect of the present invention, and with reference to FIG. 5A, a photo-mask 200 may, for example, include shielding parts and exposure parts, wherein a portion of the shielding part may extend into an edge region of a corresponding exposure part (e.g., be surrounded on, for example, three sides by the corresponding exposure part). In a second aspect of the present invention, and with reference to FIG. 5B, a photo-mask 210 may, for example, include shielding parts and exposure parts, wherein a portion of the shielding part may be disposed within a central region of a corresponding exposure part (e.g., be surrounded on, for example, four sides by the corresponding exposure part). During formation of the patterned color filters 134, as will be discussed in greater detail below, the shielding parts of the photo-mask 200 are aligned over regions of the color filter 134 where concave parts 132 are to be formed. The region of the photo-mask 200 where the shielding part extends into an edge region of a corresponding exposure part scatters a first amount of light whereas the region of the photo-mask 210 where the shielding part is disposed within a central region of a corresponding exposure part scatters a second amount of light, greater than the first amount. Accordingly, a residual film may more likely remain after formation of the patterned color filters 134 using the photo-mask 210 than after formation of the patterned color filters 134 using the photo-mask 200. Thus, a first concave part 132 formed at an edge region of a corresponding color filter 134, aligned with an edge region of a corresponding pixel area, using the photo-mask 200 may more likely expose the protective film 118 than a first concave part 132 formed at a central region of a corresponding color filter 134 using the photo-mask 210.

Referring back to FIGS. 3 and 4, the overcoat layer 152 may, for example, be provided as an organic insulating material and be formed on the color filters 134. In one aspect of the present invention, the overcoat layer 152 may compensate a step difference that exists between adjacent patterned color filters 134, thereby forming a substantially planar surface and preventing impurities from the patterned color filters 134 to contaminate a subsequently provided liquid crystal layer.

According to principles of the present invention, a second pixel contact hole 120 having a second width formed through a portion of the overcoat layer 152 and aligned within the first pixel contact hole 124 to expose a portion of a drain electrode 110. In one aspect of the present invention, the second width may be less than the first width.

Pixel electrodes 122 may, for example, be formed on the overcoat layer 152 and be aligned with a pixel are so as to overlap with individual the patterned color filters 134. In one aspect of the present invention, each pixel electrode 122 may, for example, be electrically connected to a corresponding drain electrode 110 via the second pixel contact hole 120, which is aligned within the first concave part 132 of a corresponding patterned color filter 134.

Figure 1:
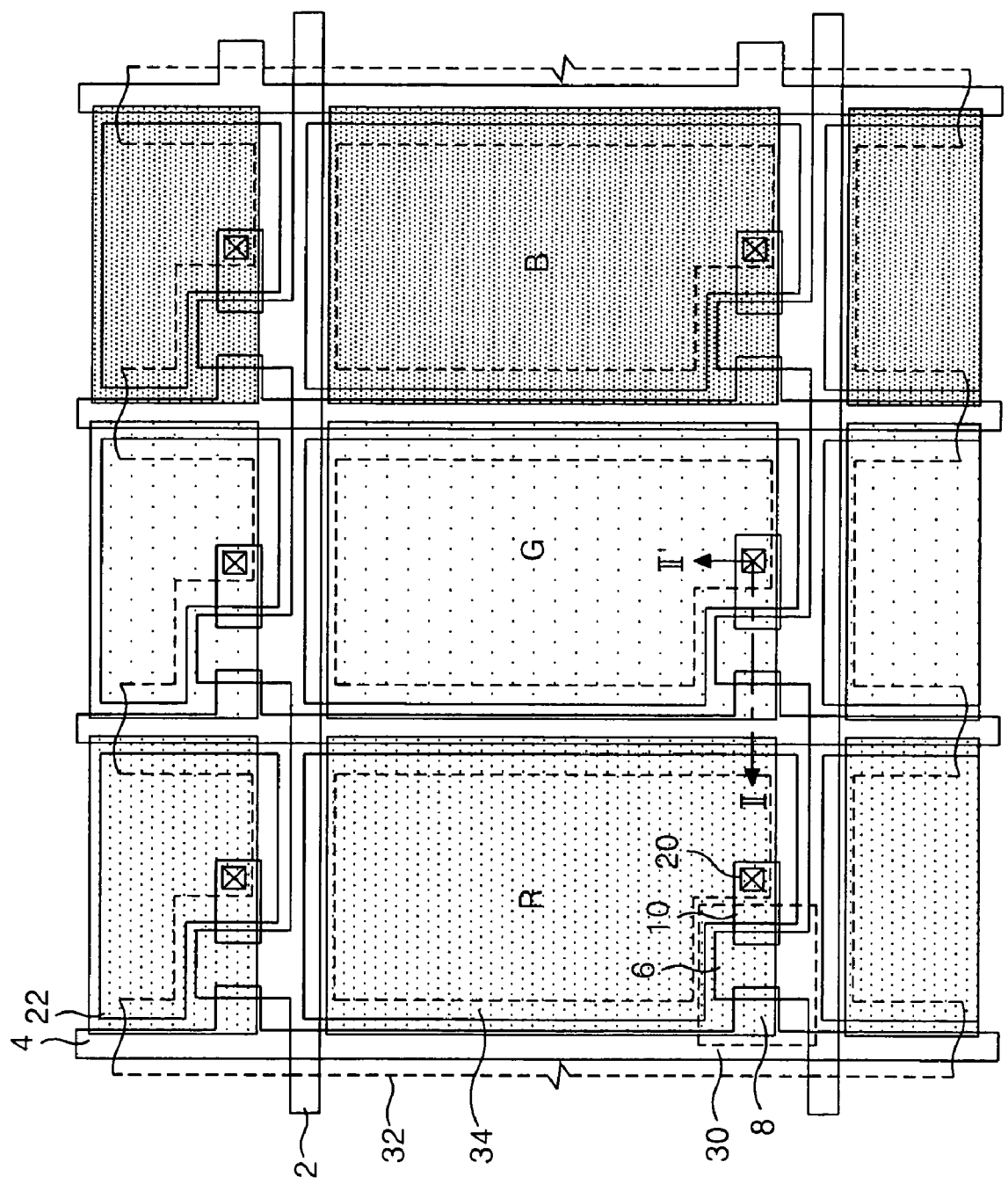
FIG. 1 illustrates a plan view of a related art color filter-on-thin film transistor (COT) substrate.
Figure 2:
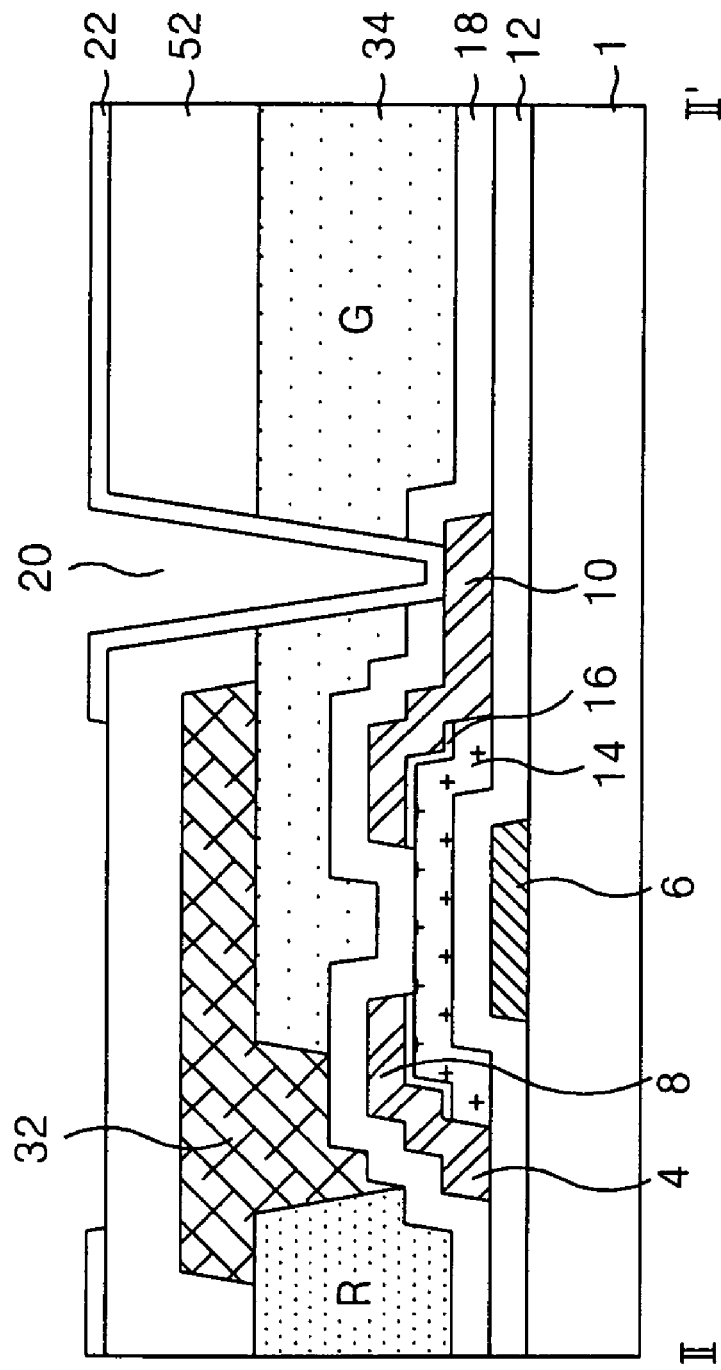
FIG. 2 illustrates a sectional view of the COT substrate shown in FIG. 1, taken along the line II-II'.

Constructed as described above, the COT substrate according to principles of the first embodiment of the present invention includes a plurality of color filters, patterned so as to be stripe-shaped and having concave parts at predetermined regions therein. In one aspect of the first embodiment of the present invention, the patterned color filters 134 may overlap the gate lines 102 and may be formed to a predetermined thickness such that a predetermined amount (e.g., at least about 90%) of external light that is incident to the COT substrate, as well as light that is reflected by the gate line 102, is absorbed by the patterned color filter 134. In another aspect of the first embodiment, two patterned color filters 134 capable of transmitting light having different wavelength ranges may overlap each other on the data line 104 to effectively function as a black matrix film and absorb substantially all external light that is incident to the COT substrate as well as light that is reflected by the data line 104. Accordingly, a black matrix film that overlaps the gate and data lines 102 and 104, and corresponding peripheral portions of the patterned color filters 134, is not required, thereby eliminating the need for a black matrix film, reducing the number of mask processes required to fabricate the COT substrate, decreasing manufacturing costs, and increasing productivity. Further, by forming the first concave part 132 within each patterned color filter 134, the amount of color filter material through which a pixel contact hole is formed may be significantly reduced or eliminated, thereby minimizing or eliminating potentially unattractive light transmission patterns. Moreover, by forming the first concave part 132 within each color filter 134 using the photo-mask 200, narrow pixel contact holes may be easily formed within the overcoat layer 152 to enable electrical contact between drain and pixel electrodes 110 and 122. Lastly, by forming the first concave part 132 within each patterned color filter 134 using the photo-mask 210, the aspect-ratio of the portion of the pixel contact hole formed within the residual film remaining after formation of the color filter 134 may be significantly reduced compared to the aspect ratio of the contact hole illustrated in FIG. 2, thereby facilitating electrical contact between the drain and pixel electrodes 110 and 122.

FIGS. 6A to 10B variously illustrate plan and sectional views of the formation of the COT substrate according to principles of the present invention.

Figure 6A:
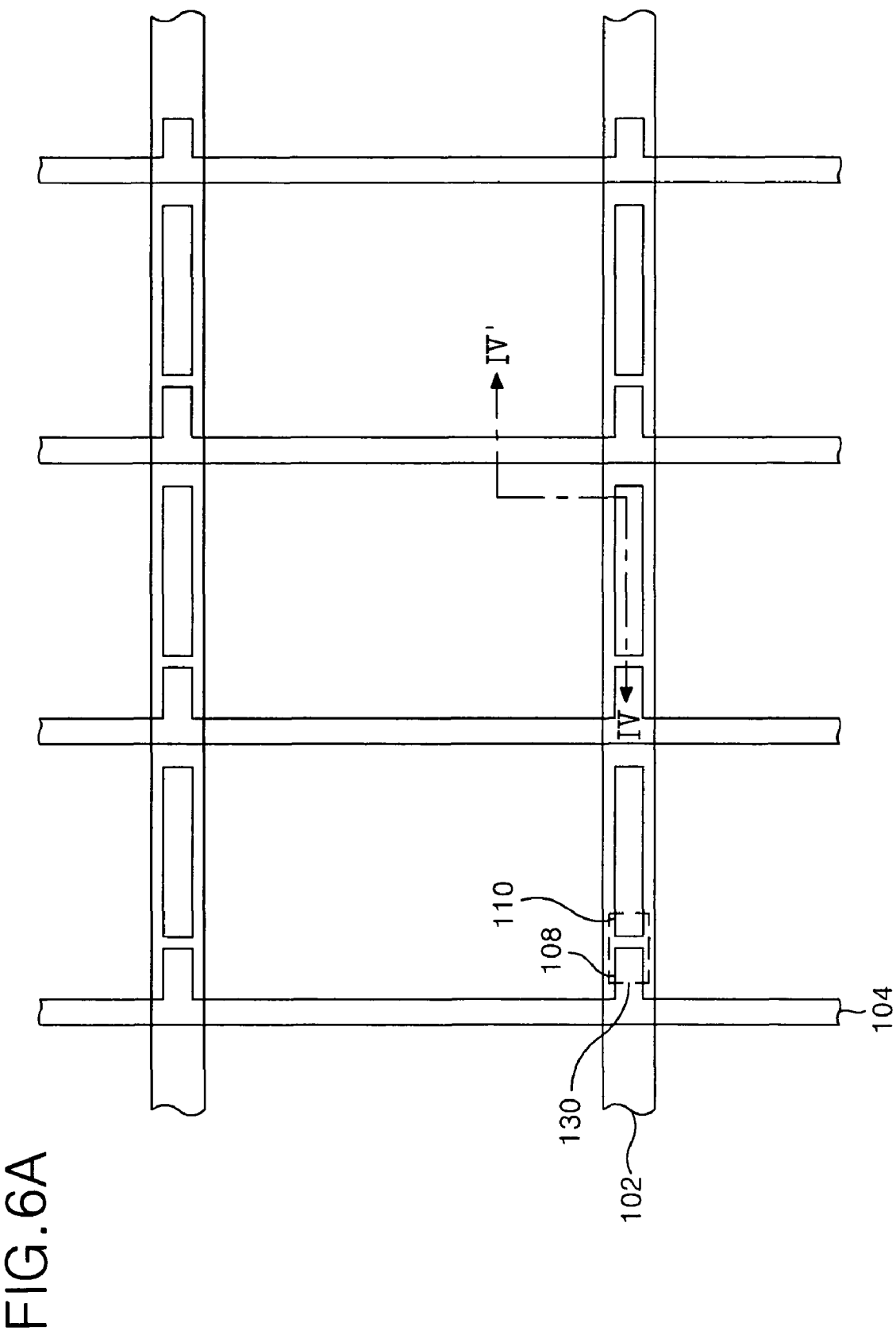
FIGS. 6A and 6B illustrate plan and sectional views, respectively, of the formation of a TFT and a signal line according to principles of the present invention.
Figure 6B:
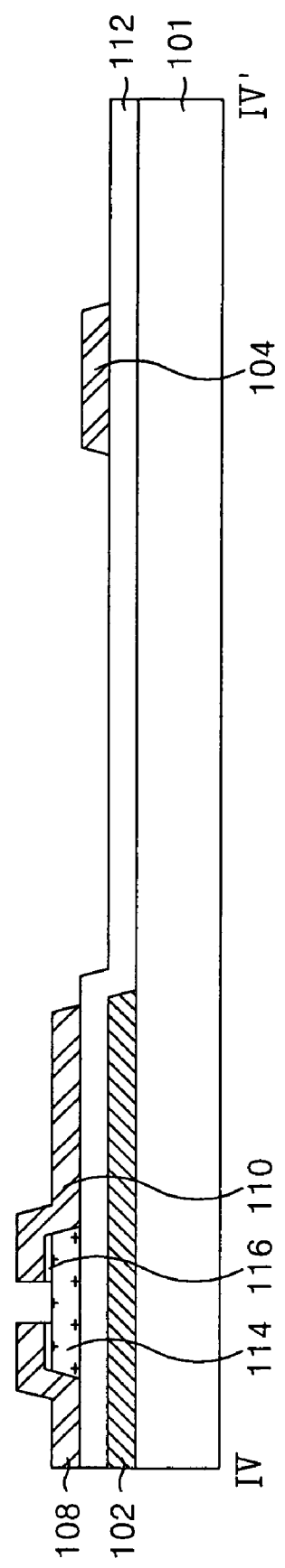

Referring to FIGS. 6A and 6B, the substrate 101 may be provided and a gate metal pattern, a data metal pattern, and the TFT 130 may be formed on the substrate 101.

The gate metal pattern may, for example, include the gate line 102 and the gate electrode 106. In one aspect of the present invention, the gate metal pattern may, for example, be formed by depositing a gate metal layer on the substrate 101 via a deposition method such as sputtering, or the like. In another aspect of the present invention, the gate metal layer may include Al, AlNd, Cr, MoW, Cr/Al, Cu, Al(Nd), Mo/Al, Mo/Al(Nd), Cr/Al(Nd), or the like, or combinations thereof. After being deposited, the gate metal layer may be patterned via a first photolithography process using a first mask and etching process to form the gate metal pattern.

Subsequent to forming the gate metal pattern, the gate insulating film 112 may be deposited over the entire substrate 101 via a deposition method such as plasma enhanced chemical vapor deposition (PECVD), sputtering, or the like. In one aspect of the present invention, the gate insulating film 112 may include an inorganic insulating material such as silicon oxide (SiOx), silicon nitride (SiNx), or the like, or combinations thereof.

Next, a semiconductor pattern may be formed on the gate insulating film 112. In one aspect of the present invention, the semiconductor pattern may, for example, include the active layer 114 and the ohmic contact layer 116. In another aspect of the present invention, the semiconductor pattern may, for example, be formed by depositing a semiconductor layer on the gate insulating film 112 via a deposition method such as PECVD, sputtering, or the like. In yet another aspect of the present invention, the semiconductor layer may, for example, include an amorphous silicon layer and an n+ amorphous silicon layer. After being deposited, the semiconductor layer may be patterned via a second photolithography process using a second mask and etching process to form the semiconductor pattern.

Subsequent to formation of the semiconductor pattern, the data metal pattern may be formed. In one aspect of the present invention, the data metal pattern may, for example, include the data line 104, the source electrode 108, and the drain electrode 110. In another aspect of the present invention, the data metal layer may, for example, be formed by depositing a source/drain metal layer on the gate insulating film 112 and over the semiconductor pattern via a deposition method such as PECVD, sputtering, or the like. In yet another aspect of the present invention, the source/drain metal layer may include Cr, MoW, Cr/Al, Cu, Al(Nd), Mo/Al, Mo/Al(Nd), Cr/Al(Nd), or the like, or combinations thereof. After being deposited, the source/drain metal layer may be patterned via a third photolithography process using a third mask and etching process to form the data metal pattern. In one aspect of the present invention, a portion of the ohmic contact layer 116 exposed between the source and drain electrodes 108 and 110 during the third photolithography process may be removed to expose the active layer 114.

As discussed above, the aforementioned semiconductor pattern and data metal pattern are formed using different masks in different photolithography processes. However, and in an alternate aspect of the present invention, the semiconductor and data metal patterns may be formed in a single photolithography process using a single partial transmission mask (e.g., a diffraction exposure or halftone mask).

Figure 7A:
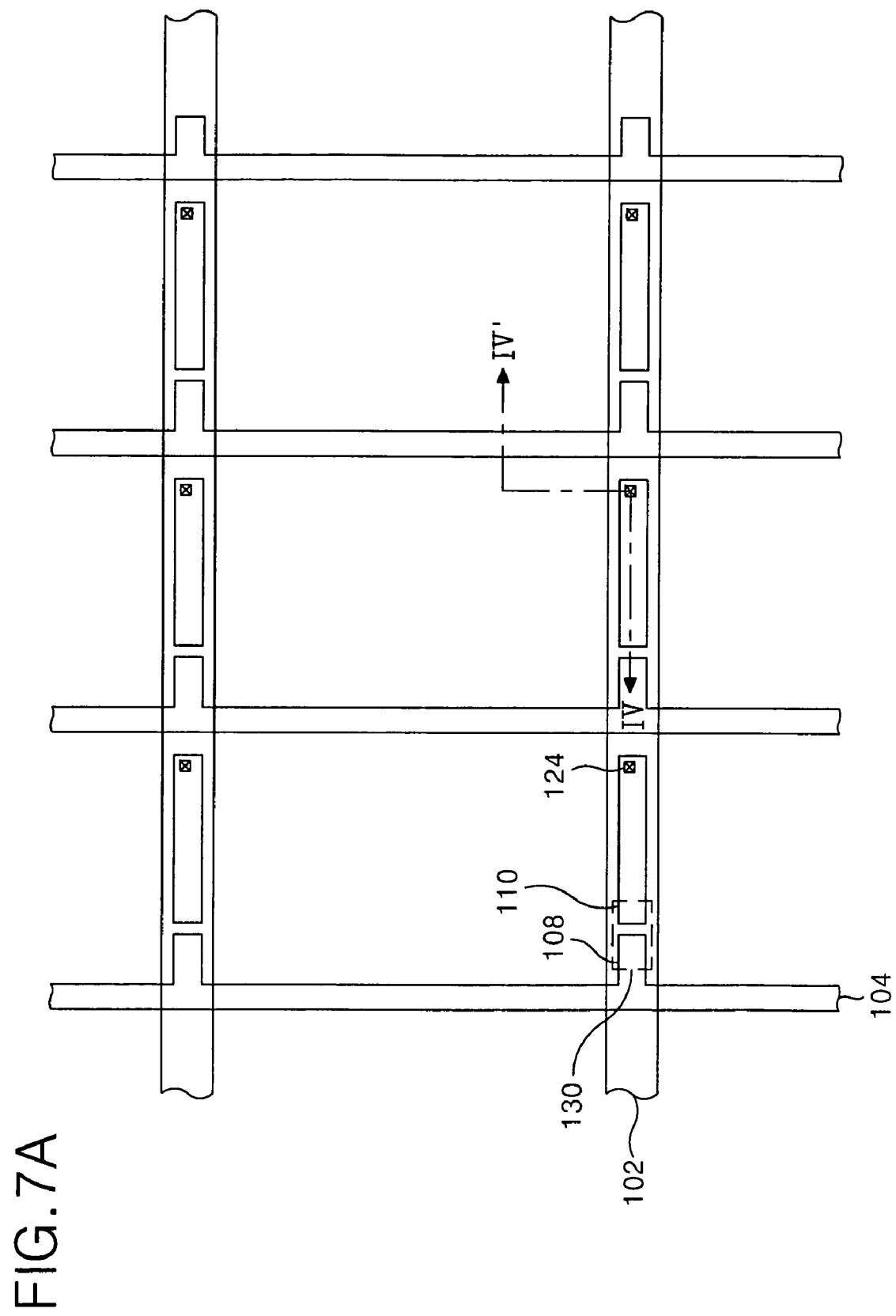

After forming the gate and data metal patterns and the TFT 130, and with reference to FIGS. 7A and 7B, the protective film 118 and the first pixel contact hole 124 may be formed. For example, the protective film 118 may be formed on the gate insulating film 112 and over the data metal pattern via a deposition method such as PECVD, sputtering, or the like. In one aspect of the present invention, the protective film 118 may include organic insulating material or inorganic insulating material, such as that used in the gate insulating film 112, or the like, or combinations thereof. After being deposited, the protective film 118 may be patterned via a fourth photolithography process using a fourth mask and etching process to form the first pixel contact hole 124 that exposes a portion of the drain electrode 110.

Figure 8A:
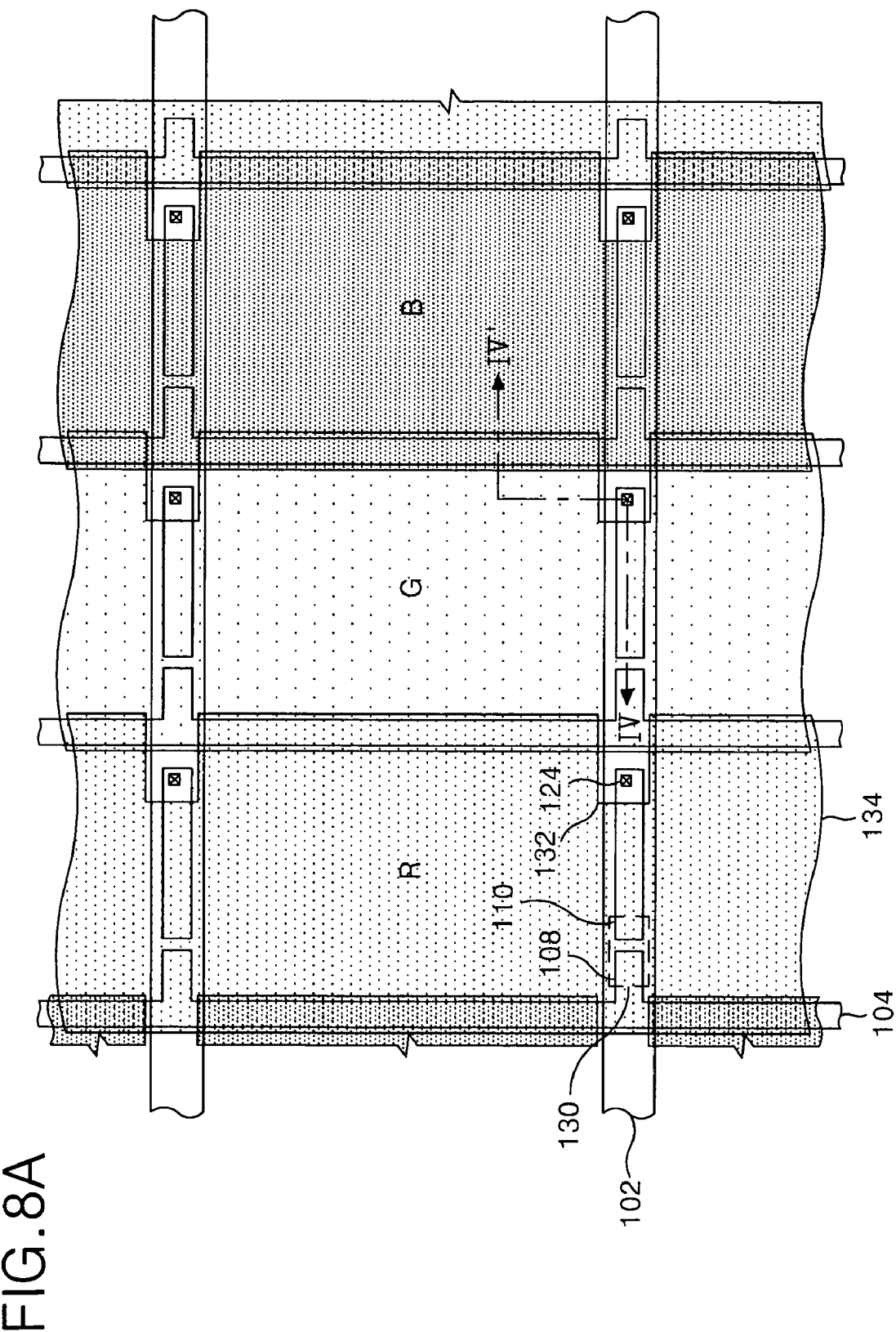

After forming and patterning the protective film 118, and with reference to FIGS. 8A and 8B, the color filter layer, including the patterned R, G, and B color filters 134, may be formed. For example, a first photo-resist having, for example, a red (R) pigment dispersed therein may be spread over the entire substrate 101 and on the protective film 118. After being spread, the first photo-resist may be developed via a fifth photolithography process using a fifth mask and suitable material removal process. In one aspect of the present invention, the fifth mask may be provided as either of the aforementioned photo-masks 200 or 210. Accordingly, the fifth photolithography process may, for example, form a red (R) color filter 134, patterned so as to be stripe-shaped and having the aforementioned first concave part 132 that exposes the first pixel contact hole 124 as well as portions of the protective film 118. Subsequent to the fifth photolithography process, sixth and seventh photolithography processes may be repeated in a similar manner as discussed above to form, for example, green (G) and blue (B) patterned color filters 134 having the aforementioned first concave part 132.

Figure 9A:
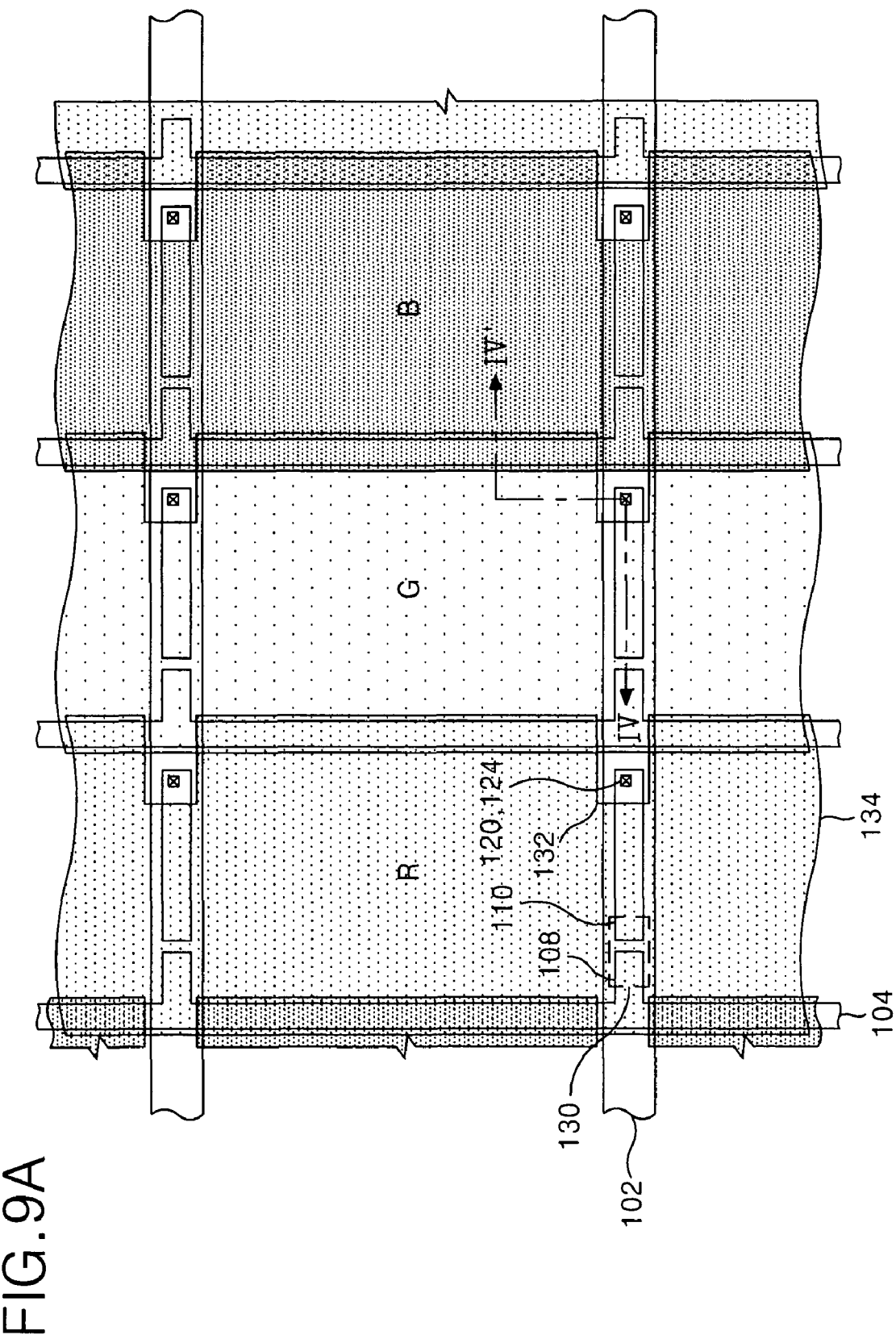
FIGS. 9A and 9B illustrate plan and sectional views, respectively, of the formation of an overcoat layer according to principles of the present invention.
Figure 9B:
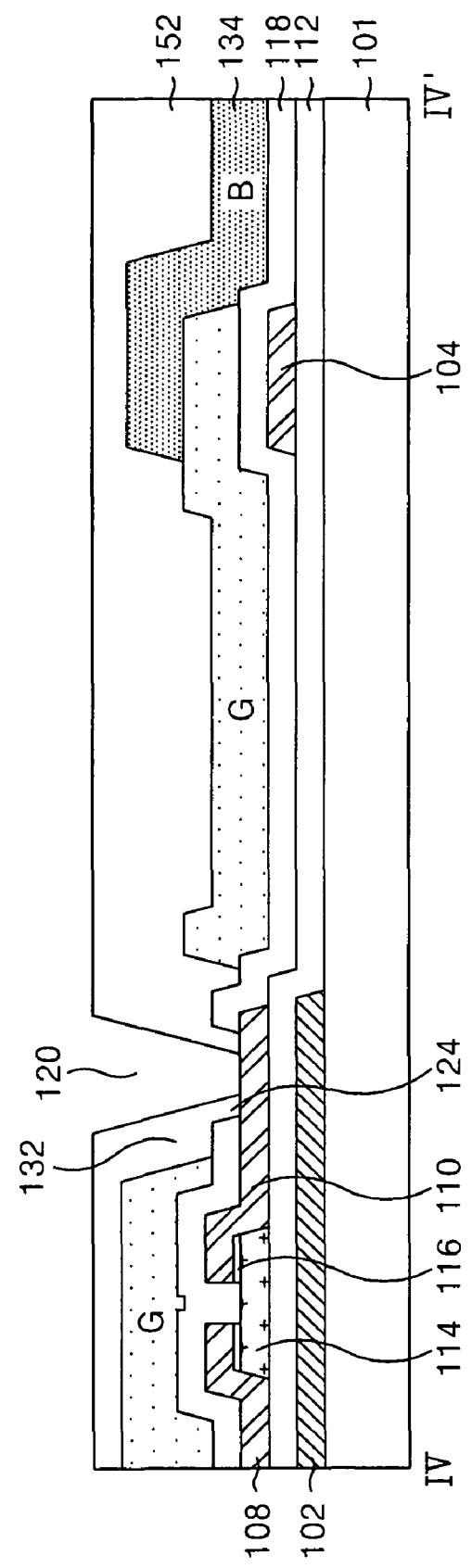

After forming the color filter layer, and with reference to FIGS. 9A and 9B, the overcoat layer 152 and the second pixel contact hole 120 may be formed. For example, the overcoat layer 152 may be formed over the substrate 101 and on the patterned color filters 134 via a deposition method such as spin coating, spin-less coating, or the like. After being deposited, the overcoat layer 152 may be patterned via an eighth photolithography process using an eighth mask and etching process to form the second pixel contact hole 120 that exposes a portion of the drain electrode 110. It will be appreciated that, depending on the type of photo-mask used in the fifth to seventh photolithography processes, the eighth photolithography process may form a portion of the second pixel contact hole 120 through a residual film remaining after formation of the patterned color filters 134.

Figure 10A:
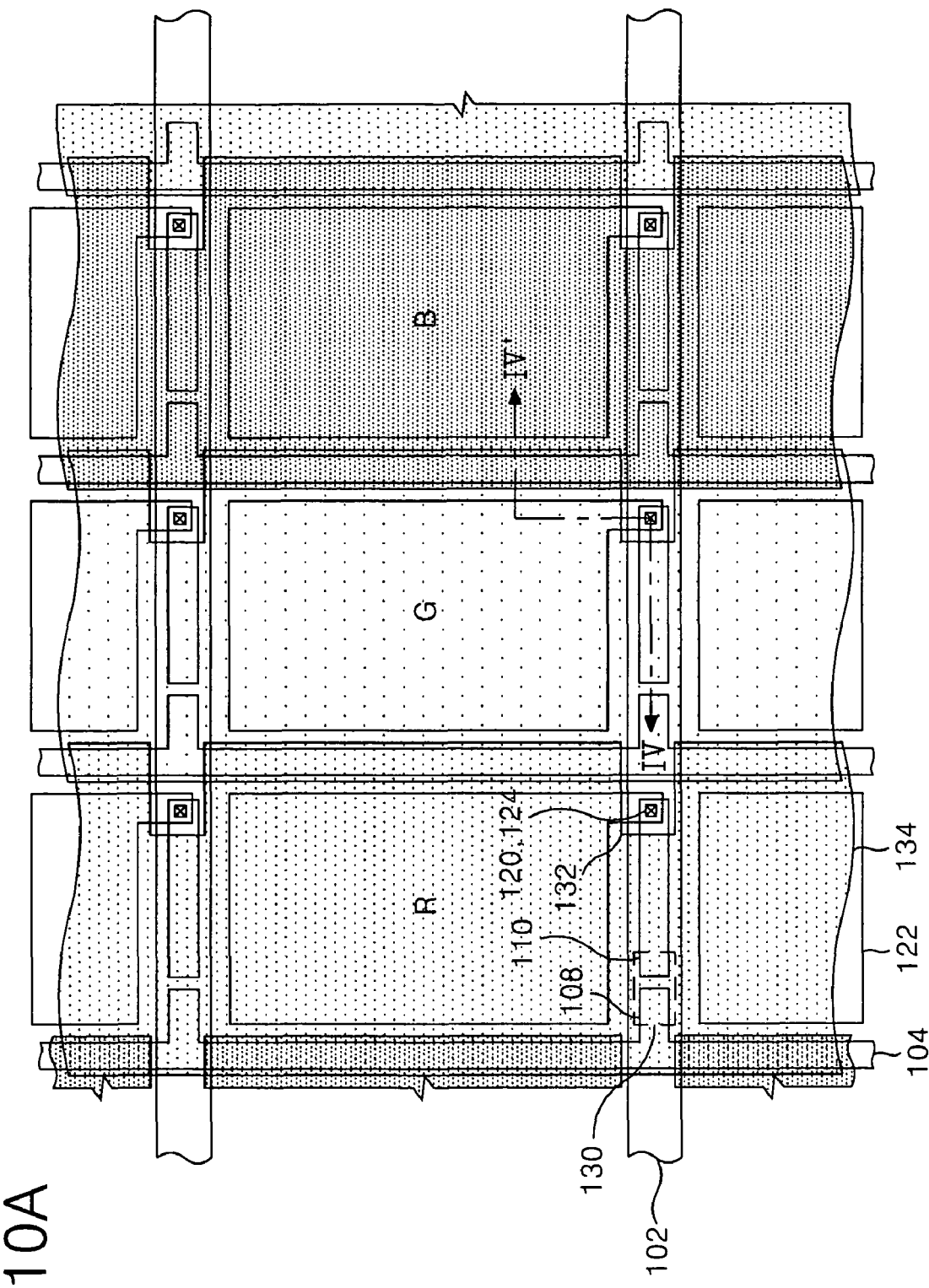

After forming and patterning the overcoat layer 152, and with reference to FIGS. 10A and 10B, a transparent conductive pattern may be formed. In one aspect of the present invention, the transparent conductive pattern may, for example include the pixel electrode 122. In another aspect of the present invention, the transparent conductive pattern may, for example, be formed by depositing a transparent conductive film on the overcoat layer 152 via a deposition method such as PECVD, sputtering, or the like. In yet another aspect of the present invention, the transparent conductive film may include indium tin oxide (ITO), tin oxide (TO), or indium zinc oxide (IZO), or the like, or combinations thereof. After being deposited, the transparent conductive film may be patterned via a ninth photolithography process using a ninth mask and etching process to form pixel electrodes 122 that overlap individual ones of the patterned color filters 134 and electrically contact portions of corresponding drain electrodes 110 via the second pixel contact hole 124 in an area corresponding to concave parts 132 of the patterned color filters 134.

Figure 11:
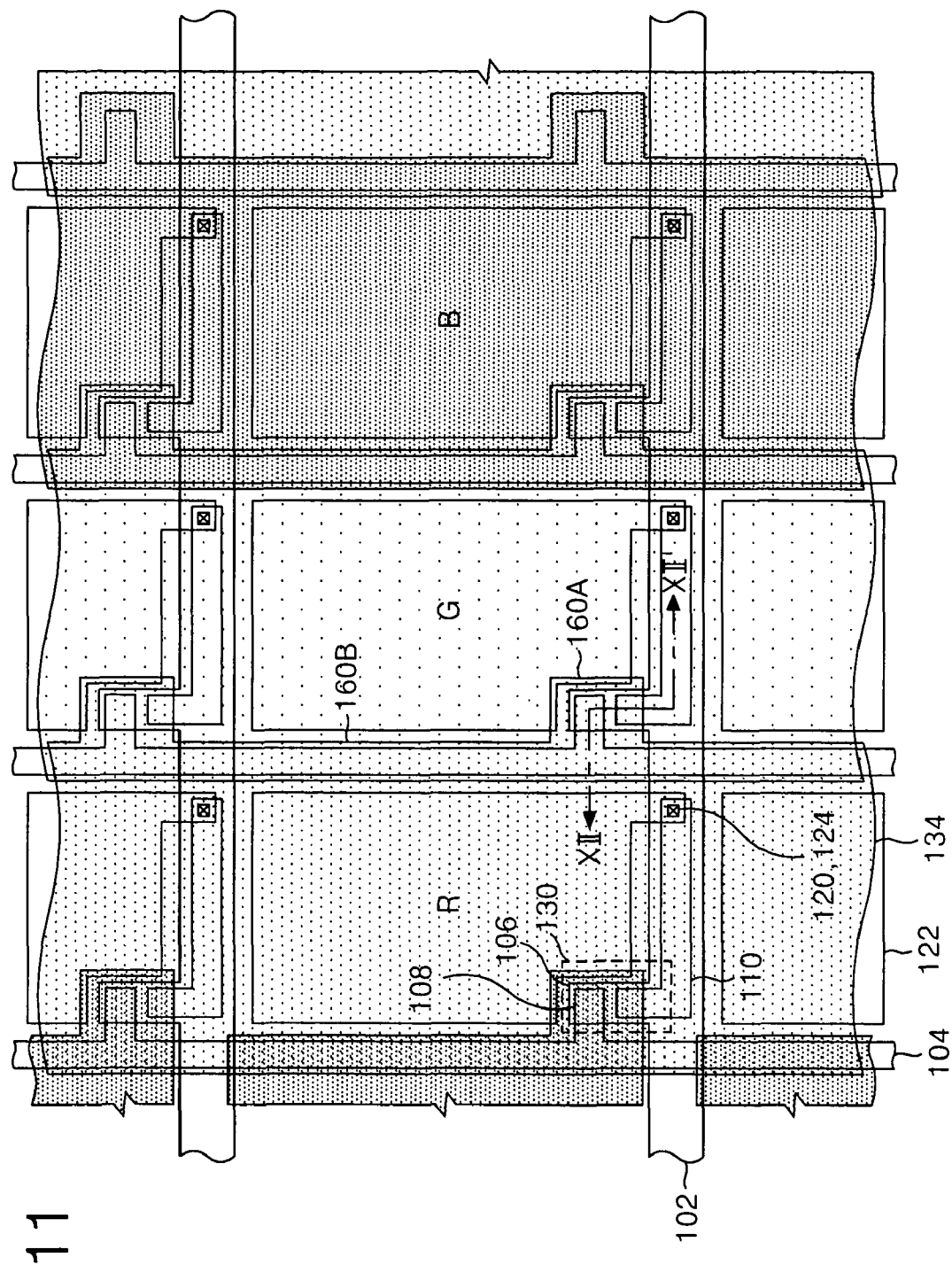
FIG. 11 illustrates a plan view of a COT substrate according to a second embodiment of the present invention.
Figure 12:
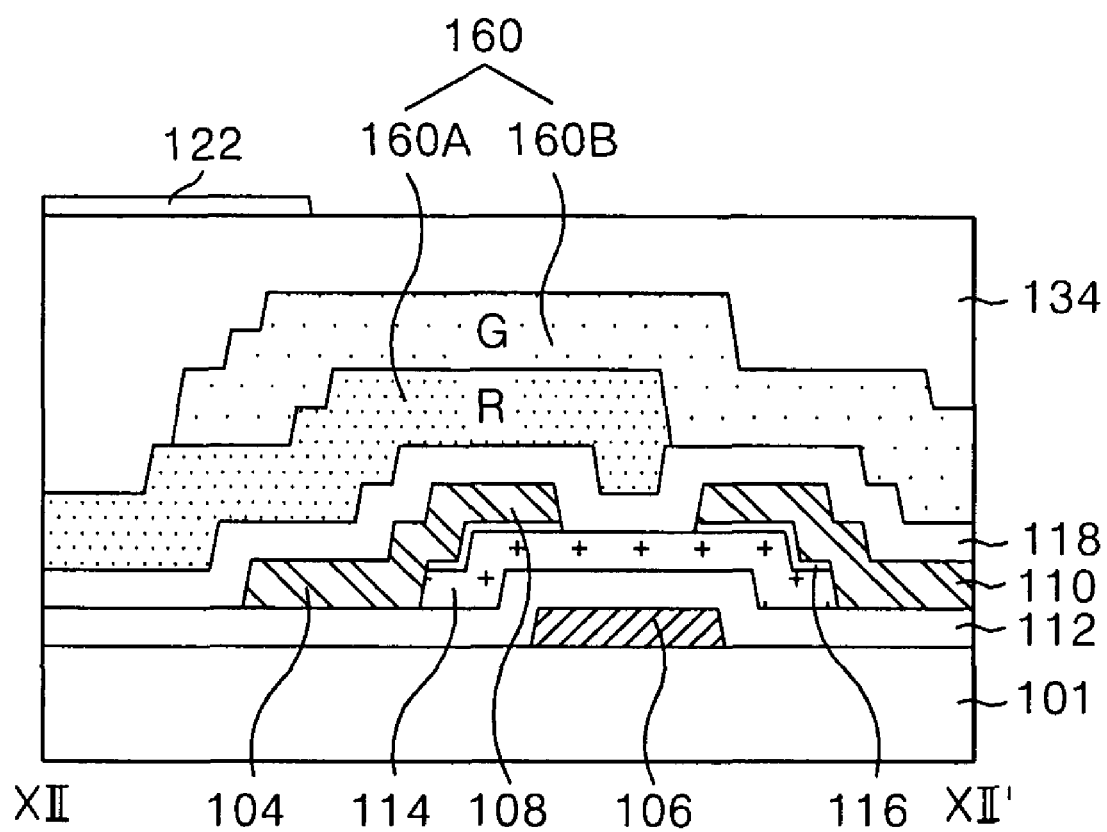
FIG. 12 illustrates a sectional view of the COT substrate shown in FIG. 11, taken along the line XII-XII'.

FIG. 11 illustrates a plan view of a COT substrate according to a second embodiment of the present invention. FIG. 12 illustrates a sectional view of the COT substrate shown in FIG. 11, taken along the line XII-XII'.

The COT substrate illustrated in FIGS. 11 and 12 is similar to the COT substrate illustrated in FIGS. 3 and 4 with the exception that each patterned color filter 134 includes a convex part 160A instead of the aforementioned first concave part 132. Thus, a detailed explanation of the features common to both the first and second embodiments will be omitted.

Referring to FIG. 11, each patterned color filter 134 may, for example, include a color filter part 160B that is aligned over a particular pixel area and the aforementioned convex part 160A. In one aspect of the present invention, each convex part 160A may overlap at least the channel of a corresponding TFT 130 in a pixel area adjacent to the particular pixel area. In another aspect of the present invention, each convex part 160A may overlap an entirety of a corresponding TFT 130 in a pixel area adjacent to the particular pixel area. In yet another aspect of the present invention, each convex part 160A may be provided as a contiguous extension of a corresponding color filter part 160B, projecting into the adjacent pixel area. In still another aspect of the present invention, and with reference to FIG. 13, each convex part 160A may be disposed within the adjacent pixel area but be structurally separated from (i.e., non-contiguous to) a corresponding color filter part 160B.

According to principles of the present invention, the convex parts 160A of each patterned color filter 134 aligned over a particular pixel area and the color filter part 160B of a patterned color filter 134 aligned over a pixel area adjacent to the particular pixel area may overlap each other within a region of the adjacent pixel area over the TFT 130 to form a light shielding part 160. In another aspect of the present invention, adjacent patterned color filters 134 may be formed sequentially and, as discussed above, when portions of two such patterned color filters 134 overlap each other at least over the channel of the TFT 130 as shown in FIG. 12, they may effectively function as a black matrix film and absorb substantially all external light that is incident to the COT substrate. In yet another aspect of the present invention, each light shielding part 160 may comprise R and B color filters 134, R and G color filters 134, or G and B color filters 134. In still another aspect of the present invention, and with reference to FIG. 13, the range of wavelengths of light that convex part 160A, disposed within a particular pixel area, transmits may be selected independently of the range of wavelengths of light that a corresponding color filter part 160B, aligned over a pixel area adjacent to the particular pixel area, transmits. In a further aspect of the present invention, the range of wavelengths of light that the convex and color filter parts 160A and 160B of a light shielding part 160 respectively transmit may be further selected to maximize the degree to which the light shielding part 160 absorbs light and prevents externally incident light to induce leakage current within the channel of the TFT 130 without the use of a black matrix film.

Figure 14:
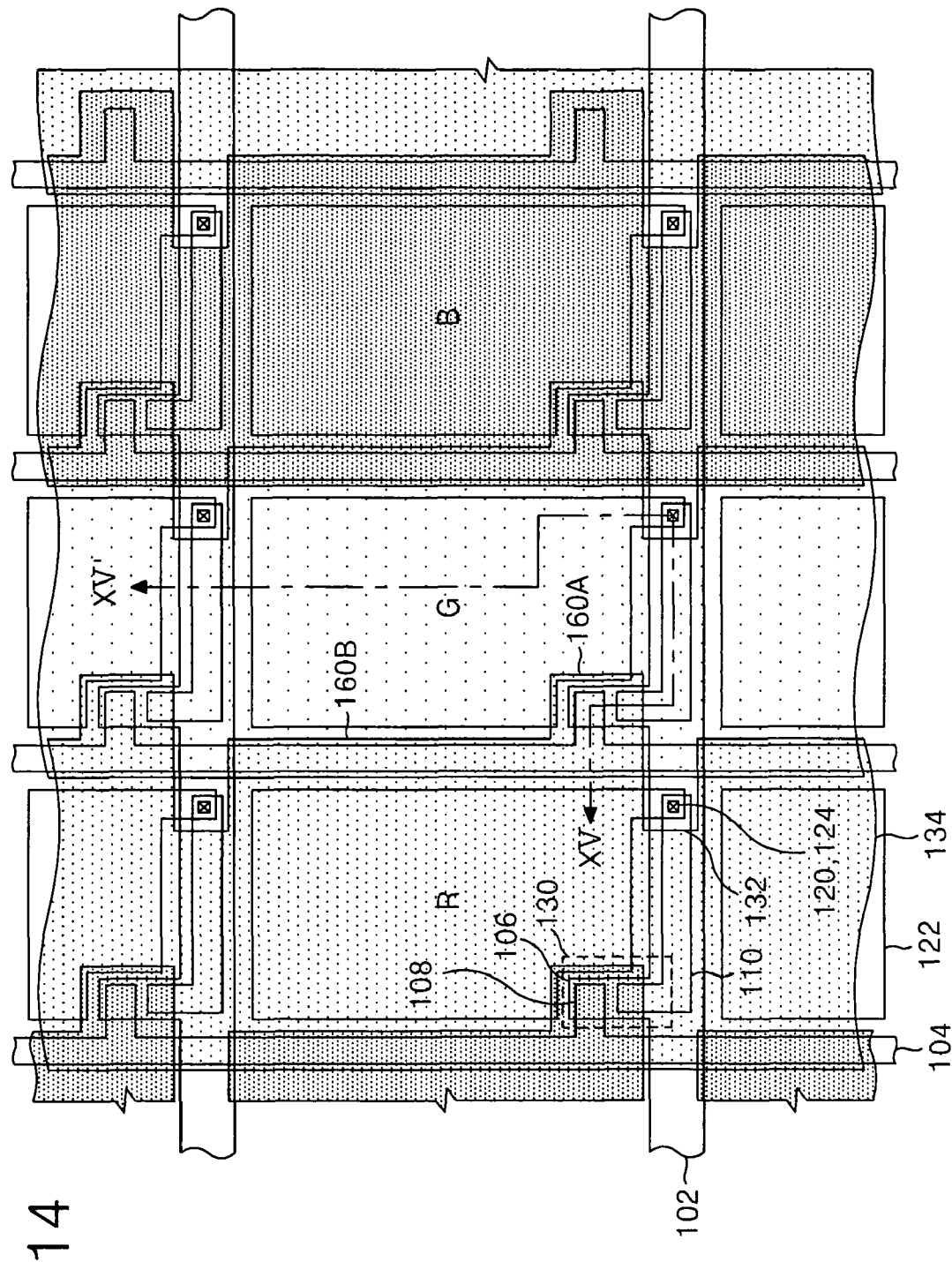
FIG. 14 illustrates a plan view of a COT substrate according to a third embodiment of the present invention.
Figure 15:
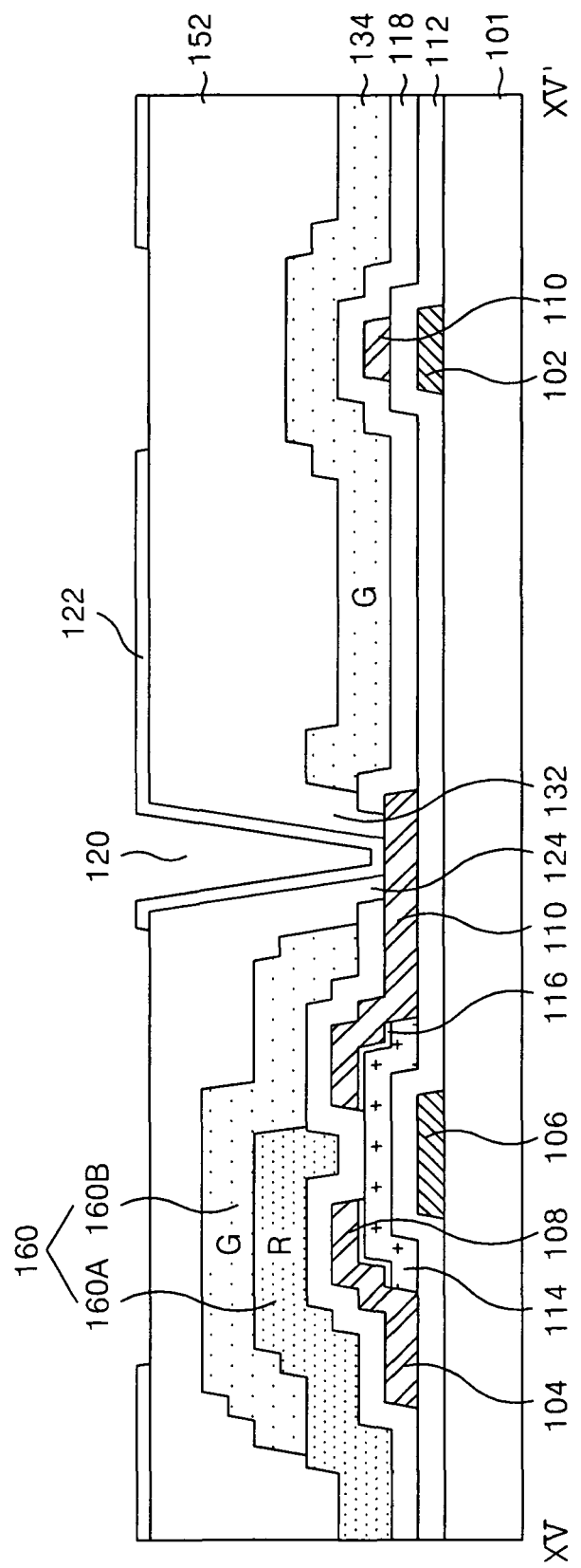
FIG. 15 illustrates a sectional view of the COT substrate shown in FIG. 14, taken along the line XV-XV'.

FIG. 14 illustrates a plan view of a COT substrate according to a third embodiment of the present invention. FIG. 15 illustrates a sectional view of the COT substrate shown in FIG. 14, taken along the line XV-XV'.

The COT substrate illustrated in FIGS. 14 and 15 is similar to the COT substrate illustrated in FIGS. 3 and 4 with the exception that the aforementioned light shielding parts 160 of the second embodiment are additionally present in the COT substrate of the first embodiment. Thus, a detailed explanation of the features common to both the first and third embodiments will be omitted.

Figure 13:
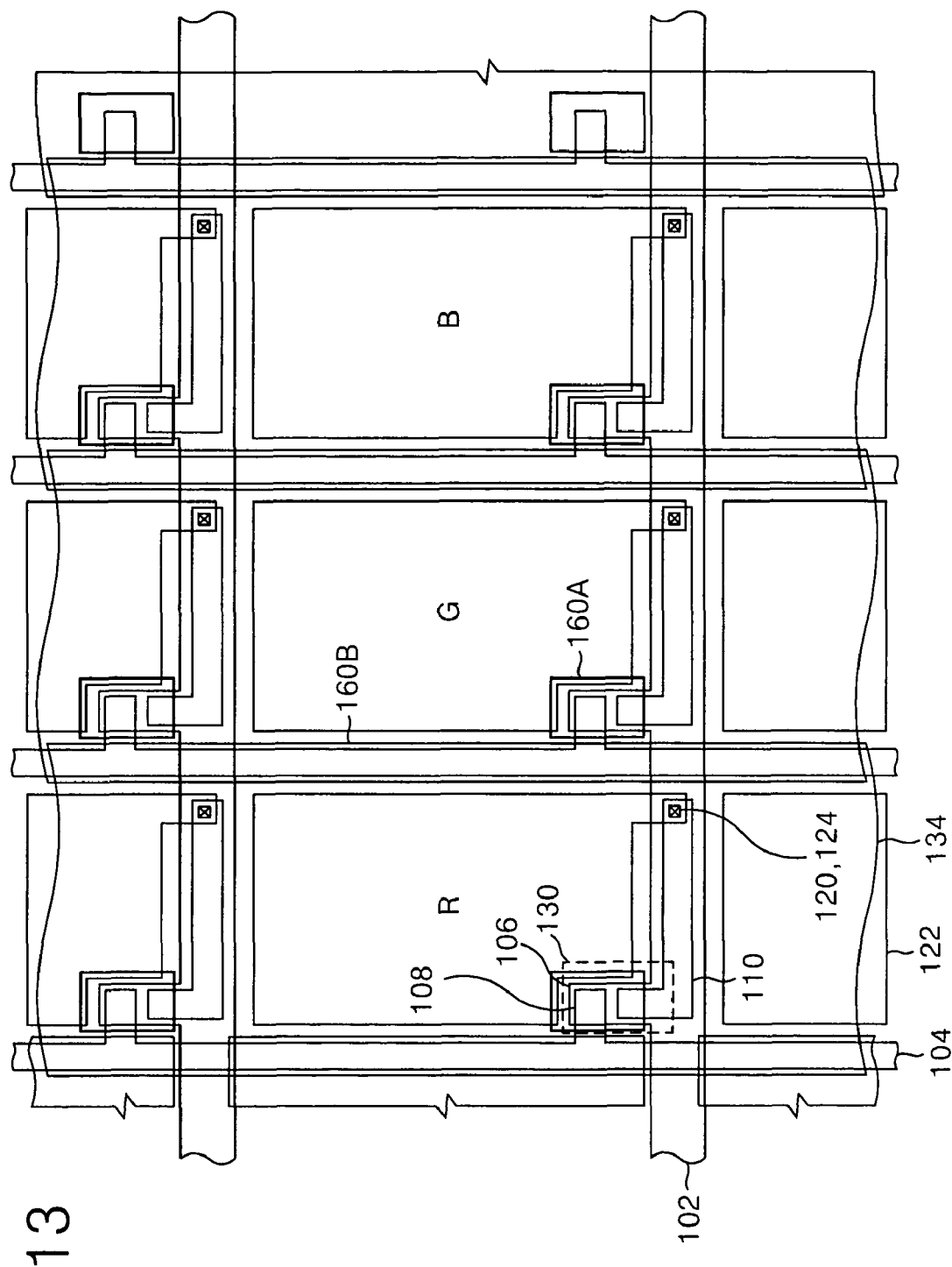
FIG. 13 illustrates a plan view of a light shielding part according to an alternate aspect of the second embodiment of the present invention.

Referring to FIG. 14, each patterned color filter 134 may, for example, include in addition to the aforementioned first concave part 132, as discussed above with respect to the first embodiment illustrated in FIGS. 3 and 4, in addition to the aforementioned convex and color filter parts 160A and 160B, as discussed above with respect to the features of the second embodiment illustrated in FIGS. 11 to 13. For example, the convex parts 160A of each patterned color filter 134 aligned over a particular pixel area and the color filter part 160B of a patterned color filter 134 aligned over a pixel area adjacent to the particular pixel area may overlap each other within a region of the adjacent pixel area over the TFT 130 to form a light shielding part 160. When portions of two such color filters 134 overlap each other at least over the channel of the TFT 130 as shown in FIG. 15, they effectively function as a black matrix film absorbing substantially all external light that is incident to the COT substrate. Constructed as described above, the light shielding part 160 substantially prevents externally incident light to induce leakage current within the channel of the TFT 130 without the use of a black matrix film.

Figure 16A:
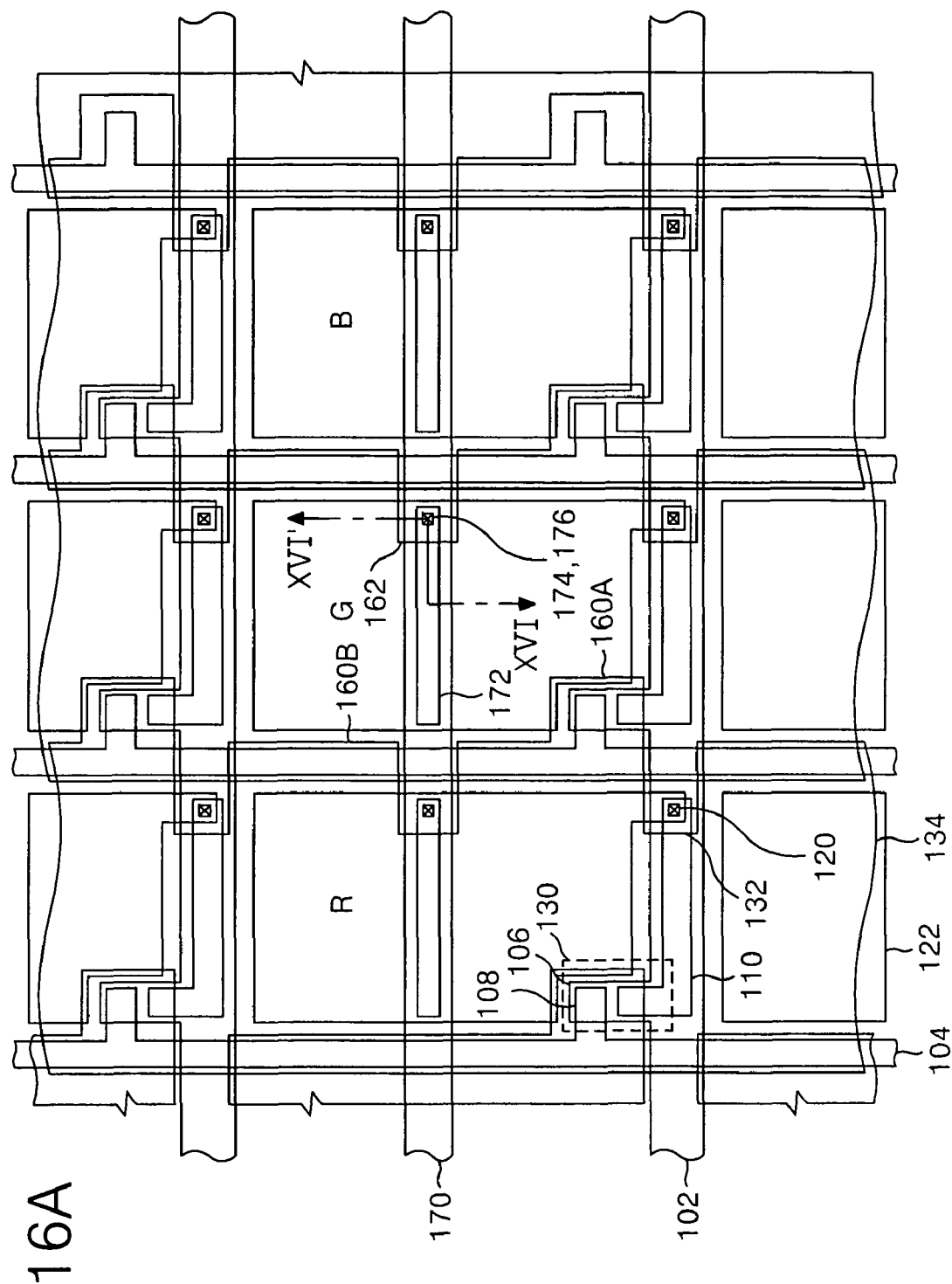
FIGS. 16A and 16B illustrate plan and sectional views, respectively, of the formation of a storage capacitor within the COT substrate according to the third embodiment of the present invention.
Figure 16B:
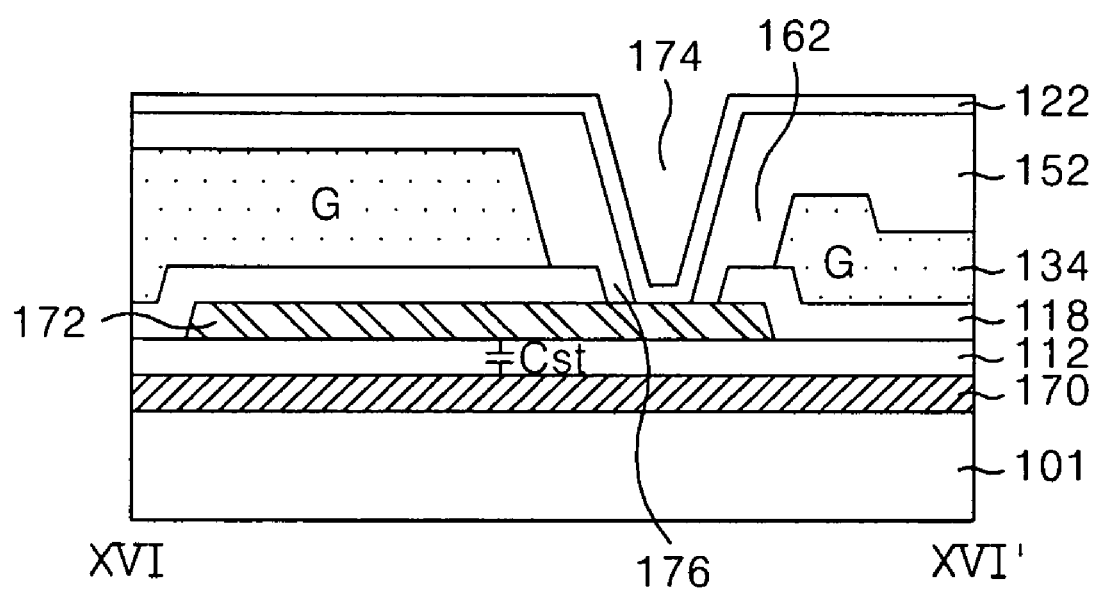

FIGS. 16A and 16B illustrate plan and sectional views, respectively, of the formation of a storage capacitor within the COT substrate according to the third embodiment of the present invention.

Although FIGS. 16A and 16B illustrate a storage capacitor incorporated within a COT substrate formed in accordance with the principles of the third embodiment of the present invention, it will be appreciated that the features illustrated and described herein may be readily extended to the COT substrate formed in accordance with the principles of the first embodiment.

Referring to FIGS. 16A and 16B, a storage capacitor Cst may be incorporated within a COT substrate fabricated in accordance with principles of the present invention. According to principles of the present invention, such a COT substrate may, for example, include a storage line 170 crossing a corresponding pixel area and arranged parallel to a corresponding gate line 102, a storage electrode 172 overlapping the storage line 170, a portion of the gate insulating film 112 between the storage line 170 and the storage electrode 172, a first storage contact hole 176 formed within the protective layer 118 and exposing a portion of the storage electrode 172, a patterned color filter 134 having a second concave part 162 aligned with the first storage contact hole 176, an overcoat layer 152 over the patterned color filters 134, a second storage contact hole 174 formed through a portion of the overcoat layer 152 aligned within the first storage contact hole 176, and a pixel electrode 122 formed on the overcoat layer 152 and electrically connected to the storage electrode 172 via the second storage contact hole 174, which is aligned within the second concave part 162 of the patterned color filter 134. According to principles of the present invention, the second concave part 162 may be formed in substantially the same manner as the first concave part 132. In one aspect of the present invention, the first and second concave parts may be formed simultaneously.

Figure 17A:
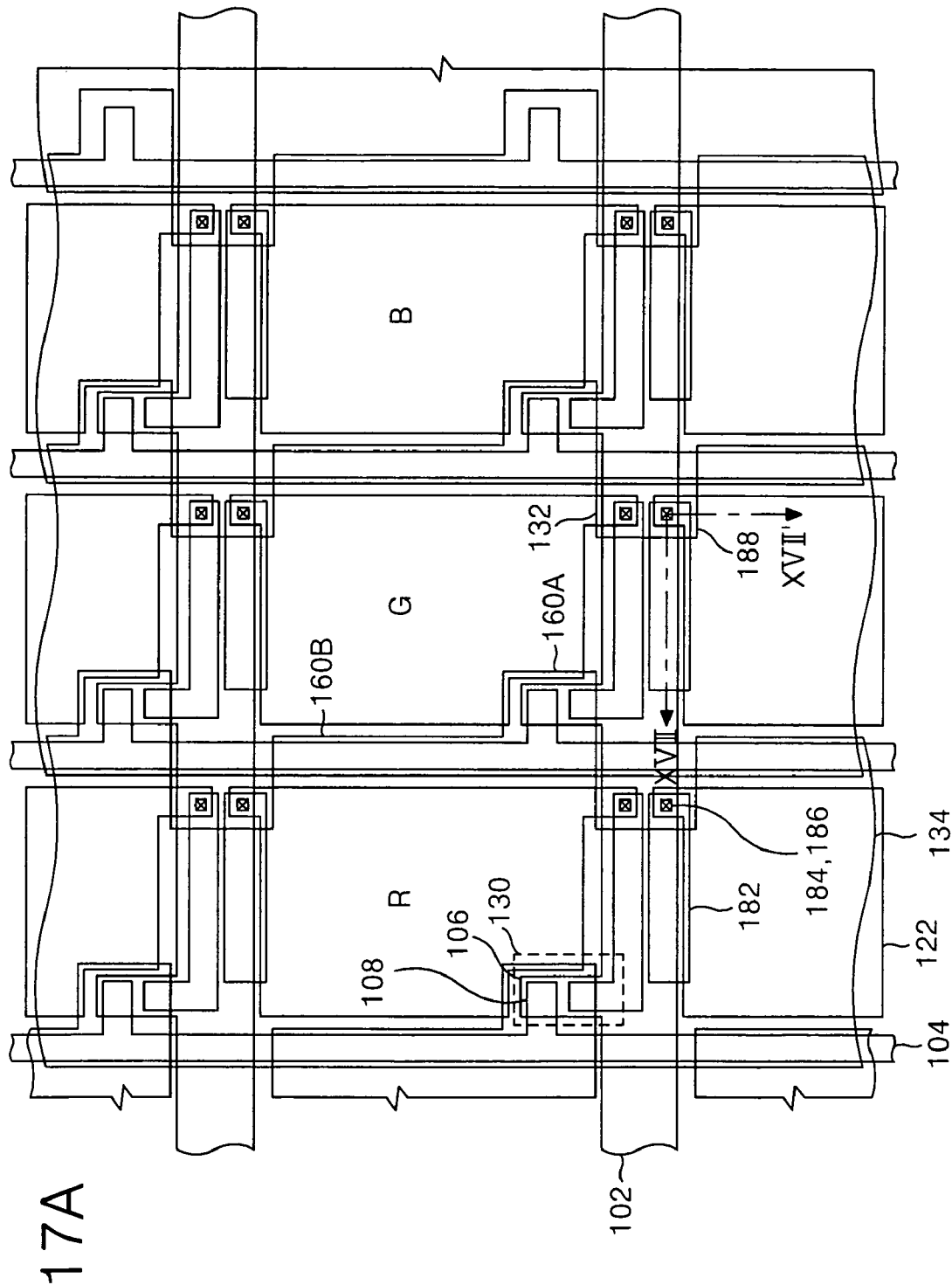
FIGS. 17A and 17B illustrate plan and sectional views, respectively, of the formation of a storage capacitor within the COT substrate according to an alternate aspect of the third embodiment of the present invention.
Figure 17B:
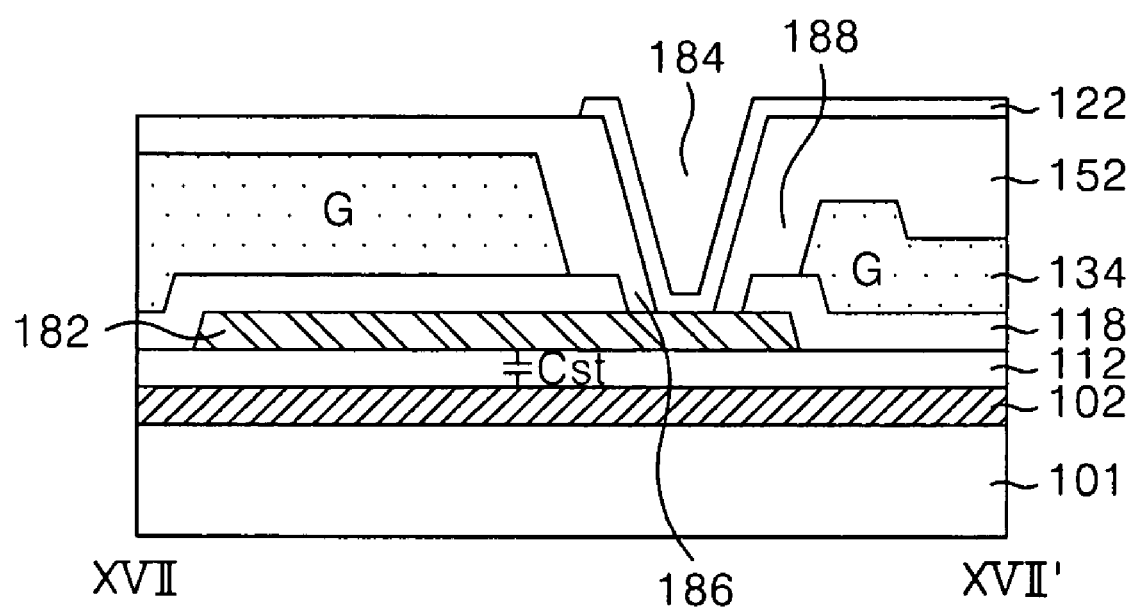

FIGS. 17A and 17B illustrate plan and sectional views, respectively, of the formation of a storage capacitor within the COT substrate according to an alternate aspect the third embodiment of the present invention.

Although FIGS. 17A and 17B illustrate a storage capacitor incorporated within a COT substrate formed in accordance with the principles of the third embodiment of the present invention, it will be appreciated that the features illustrated and described herein may be readily extended to the COT substrate formed in accordance with the principles of the first embodiment.

Referring to FIGS. 17A and 17B, a storage capacitor Cst may be incorporated within a COT substrate fabricated in accordance with principles of the present invention. According to principles of the present invention, such a COT substrate may, for example, include a previous stage gate line 102, a storage electrode 182 overlapping the previous stage gate line 102, a portion of the gate insulating film 112 between the previous stage gate line 102 and the storage electrode 182, a first storage contact hole 186 formed within the protective layer 118 and exposing a portion of the storage electrode 182, a patterned color filter 134 having a second concave part 188 aligned with the first storage contact hole 186, an overcoat layer 152 over the patterned color filters 134, a second storage contact hole 184 formed through a portion of the overcoat layer 152 aligned within the first storage contact hole 186, and a pixel electrode 122 formed on the overcoat layer 152 and electrically connected to the storage electrode 182 via the second storage contact hole 184, which is aligned within the extended concave part 188 of the patterned color filter 134. In one aspect of the present invention, the second concave part 188 may be a contiguous extension of the first concave part 132 and be formed in the same process as the first concave part 132. In one aspect of the present invention, the second concave part 188 may be formed in substantially the same manner as the first concave part 132. In one aspect of the present invention, the first and second concave parts may be formed simultaneously.

As described above, the principles of the present invention provide a COT substrate and a method of fabricating the same that includes patterned color filters, essentially having a stripe shape that includes at least one concave part and/or a convex part. Accordingly, the patterned color filters absorb external light incident to the gate and data lines as well as the TFTs and eliminate the need for a black matrix film. By eliminating the need for a black matrix film, the principles of the present invention enable a COT substrate to be fabricated in a reduced number of mask processes, thereby decreasing manufacturing costs and increasing productivity.

It will be apparent to those skilled in the art that various modifications and variation can be made in the present invention without departing from the spirit or scope of the invention. For example, while it has been shown that the patterned color filters 134 are generally oriented such that their stripe shape runs parallel to the data lines 104, the principles of the present invention may be extended to substantially any orientation of patterned color filters 134. For example, the patterned color filters 134 may be oriented such that their stripe shape runs parallel to the gate lines 102. Thus, it is intended that the present invention cover the modifications and variations of this invention provided they come within the scope of the appended claims and their equivalents.

What is claimed is:

1. A method of fabricating a color filter-on-thin film transistor (COT) substrate, comprising the steps of:
    forming the plurality of gate lines on the substrate and a plurality of gate electrodes extending from corresponding gate lines using a first mask;
    forming a gate insulating film over the substrate, on the gate lines, and on the gate electrodes;
    forming a semiconductor layer on the gate insulating film using a second mask; and
    forming the plurality of data lines, a plurality of source electrodes extending from the data lines, and a plurality of drain electrodes on the gate insulating film using a third mask,
    forming a protective film over the substrate and on thin film transistors (TFTs);
    forming a first contact hole through the protective film to expose a portion of a drain electrode in a connection area using a fourth mask,
    forming a plurality of patterned color filters on the protective film using a fifth mask, a sixth mask and a seventh mask, wherein each patterned color filter is stripe-shaped to overlap a plurality of pixel areas and is oriented parallel to one of the gate and data lines;
    forming an overcoat layer over the plurality of patterned color filters;
    forming a second contact hole through a portion of the overcoat layer within the connection area, wherein a portion of a drain electrode is exposed by the second contact hole using an eighth mask;
    forming a plurality of pixel electrodes over the patterned color filters using a ninth mask, wherein each pixel electrode is connected to a corresponding TFT,
    wherein each patterned color filter comprises a concave part corresponding the first contact hole which a width of the first contact hole is less than a width of the concave part, and a portion of the protective film and the portion of the drain electrode are exposed by the concave part and the first contact hole, and two patterned color filters overlapping at least one of a channel of a TFT and a data line.

2. The method according to claim 1, wherein the step of forming the patterned color filters includes patterning a stripe-shaped color filter that overlaps the gate lines and is oriented parallel to the data lines.

3. The method according to claim 1, wherein the step of forming at least one of the plurality of patterned color filters includes at least one of the steps of:
    forming at least one concave part, wherein the connection area is aligned within the at least one concave part; and
    forming at least one convex part extending from a side portion of the at least one patterned color filter overlapping a first pixel area to overlap a channel of a TFT in a second pixel area that is adjacent to the first pixel area.

4. The method according to claim 1, wherein the two patterned color filters include one of a pair of red and blue color filters, a pair of red and green color filters, and a pair of green and blue color filters.

* * * * *